(12) United States Patent
Umeda et al.

(10) Patent No.: US 9,563,823 B2
(45) Date of Patent: Feb. 7, 2017

(54) APPARATUS AND METHOD FOR MANAGING AN OBJECT EXTRACTED FROM IMAGE DATA

(71) Applicant: CANON KABUSHIKI KAISHA, Tokyo (JP)

(72) Inventors: Kiyoshi Umeda, Kawasaki (JP); Yusuke Hashii, Tokyo (JP); Hiroyasu Kunieda, Yokohama (JP); Hiroyuki Sakai, Chigasaki (JP); Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 13/934,865

(22) Filed: Jul. 3, 2013

(65) Prior Publication Data
US 2014/0010464 A1 Jan. 9, 2014

(30) Foreign Application Priority Data
Jul. 9, 2012 (JP) .................................. 2012-153671

(51) Int. Cl.
*G06K 9/62* (2006.01)
*G06K 9/00* (2006.01)
*G06T 11/60* (2006.01)

(52) U.S. Cl.
CPC ......... *G06K 9/6267* (2013.01); *G06K 9/00221* (2013.01); *G06T 11/60* (2013.01)

(58) Field of Classification Search
CPC ............ G06K 9/00221; G06K 9/00281; G06K 9/00275; G06K 9/00288; G06K 9/6255; G06T 11/60

USPC ................. 382/224, 217, 306, 118, 117, 190
See application file for complete search history.

(56) References Cited

U.S. PATENT DOCUMENTS

| | | | |
|---|---|---|---|
| 2003/0198368 A1* | 10/2003 | Kee ............................... | 382/118 |
| 2009/0116752 A1* | 5/2009 | Isomura et al. .............. | 382/217 |
| 2013/0036438 A1* | 2/2013 | Kutaragi ............ | H04N 21/2743 725/38 |

FOREIGN PATENT DOCUMENTS

| | | | |
|---|---|---|---|
| JP | H05-197793 | A | 8/1993 |
| JP | H08-63597 | A | 3/1996 |
| JP | H08-77334 | A | 3/1996 |
| JP | 2541688 | B2 | 10/1996 |
| JP | H11-53525 | A | 2/1999 |

(Continued)

*Primary Examiner* — Manuchehr Rahmjoo
(74) *Attorney, Agent, or Firm* — Canon U.S.A., Inc. IP Division

(57) ABSTRACT

An apparatus includes a first management unit configured to classify and manage feature information of a plurality of objects extracted from image data in units of similar feature information, a second management unit configured to classify and manage the plurality of objects extracted from the image data object by object, an association unit configured to associate the objects in the first management unit with feature information in the second management unit, and an input unit configured to input a correction instruction about classifications of the objects by the second management unit. The second management unit is configured to, if the correction instruction is input, correct and manage a classification to which a target object of the correction instruction belongs and the first management unit is configured to change and manage a classification to which feature information associated with the target object of the correction instruction belongs.

26 Claims, 42 Drawing Sheets

(56) References Cited

FOREIGN PATENT DOCUMENTS

| | | | |
|---|---|---|---|
| JP | H11143992 | A | 5/1999 |
| JP | H11-250267 | A | 9/1999 |
| JP | P2000-105829 | A | 4/2000 |
| JP | P2000-132688 | A | 5/2000 |
| JP | P2000-235648 | A | 8/2000 |
| JP | 2001028035 | A | 1/2001 |
| JP | P2001-216515 | A | 8/2001 |
| JP | P2002-183731 | A | 6/2002 |
| JP | P2003-030667 | A | 1/2003 |
| JP | 3469031 | B2 | 11/2003 |
| JP | 2009211488 | A | 9/2009 |
| JP | P2010-251999 | A | 11/2010 |
| JP | P2010-273144 | A | 12/2010 |
| JP | 2011044044 | A | 3/2011 |
| JP | P2011-516966 | A | 5/2011 |
| JP | 2011170492 | A | 9/2011 |

* cited by examiner

FIG. 22

| DICTIONARY ID 2201 | PERSON ID 2202 | FACE FEATURE AMOUNT GROUP 2203 |
|---|---|---|
| 1 | No Name1 | ▨ ▨ ▨ ▨ ⋯ |
| 2 | No Name2 | ▨ ▨ ▨ ▨ ⋯ |
| 3 | No Name3 | ▨ |
| 4 | No Name4 | ▨ ▨ |
| 5 | No Name5 | ▨ ▨ |
| 6 | No Name6 | ▨ ▨ ▨ |
| ⋮ | ⋮ | ⋮ |
|  |  |  |

FIG. 23A

| DICTIONARY ID | PERSON ID | FACE FEATURE AMOUNT GROUP |
|---|---|---|
| 1 | father | ▨ ▨ ▨ ▨ ... |
| 2 | son | ▨ ▨ ▨ ▨ ... |
| 3 | mother | ▨   2304 |
| 4 | No Name4 | ▨ ▨ |
| 5 | No Name5 | ▨ ▨ |
| 6 | No Name6 | ▨ ▨ ▨ |
| ⋮ | ⋮ | ⋮ |
|  |  |  |

| DICTIONARY ID | PERSON ID | FACE FEATURE AMOUNT GROUP |
|---|---|---|
| 1 | father | ▨ ▨ ▨ ▨ ⋯ 2401 |
| 2 | son | ▨ ▨ ▨ ▨ ▨ ⋯ |
| 3 | mother | ▨ |
| 4 | No Name4 | ▨ ▨ |
| 5 | No Name5 | ▨ ▨ |
| 6 | No Name6 | ▨ ▨ ▨ |
| ⋮ | ⋮ | ⋮ |
| | | |

FIG. 24

| DICTIONARY ID (2501) | PERSON ID (2502) | FACE FEATURE AMOUNT GROUP (2504) |
|---|---|---|
| 1 | father | ▨ ▨ ▨ ▨ ... |
| 2 | father | ▨ ▨ ▨ ▨ ... |
| 3 | son | ▨ ▧ ~2503 |
| 4 | No Name4 | ▨ ▨ |
| 5 | No Name5 | ▨ ▨ |
| 6 | No Name6 | ▨ ▨ ▨ |
| ⋮ | ⋮ | ⋮ |

FIG. 26

| DICTIONARY ID | PERSON ID | FACE FEATURE AMOUNT GROUP | |
|---|---|---|---|
| 1 | father | ▨ ▨ ▨ ▨ ▨ | |
| 2 | father | ▨ ▨ ▨ ▨ | |
| 3 | son | ▨ ▨ ~2703 | |
| 4 | | | |
| 5 | | | |
| 6 | | | |
| ⋮ | ⋮ | ⋮ | |
| | | | |

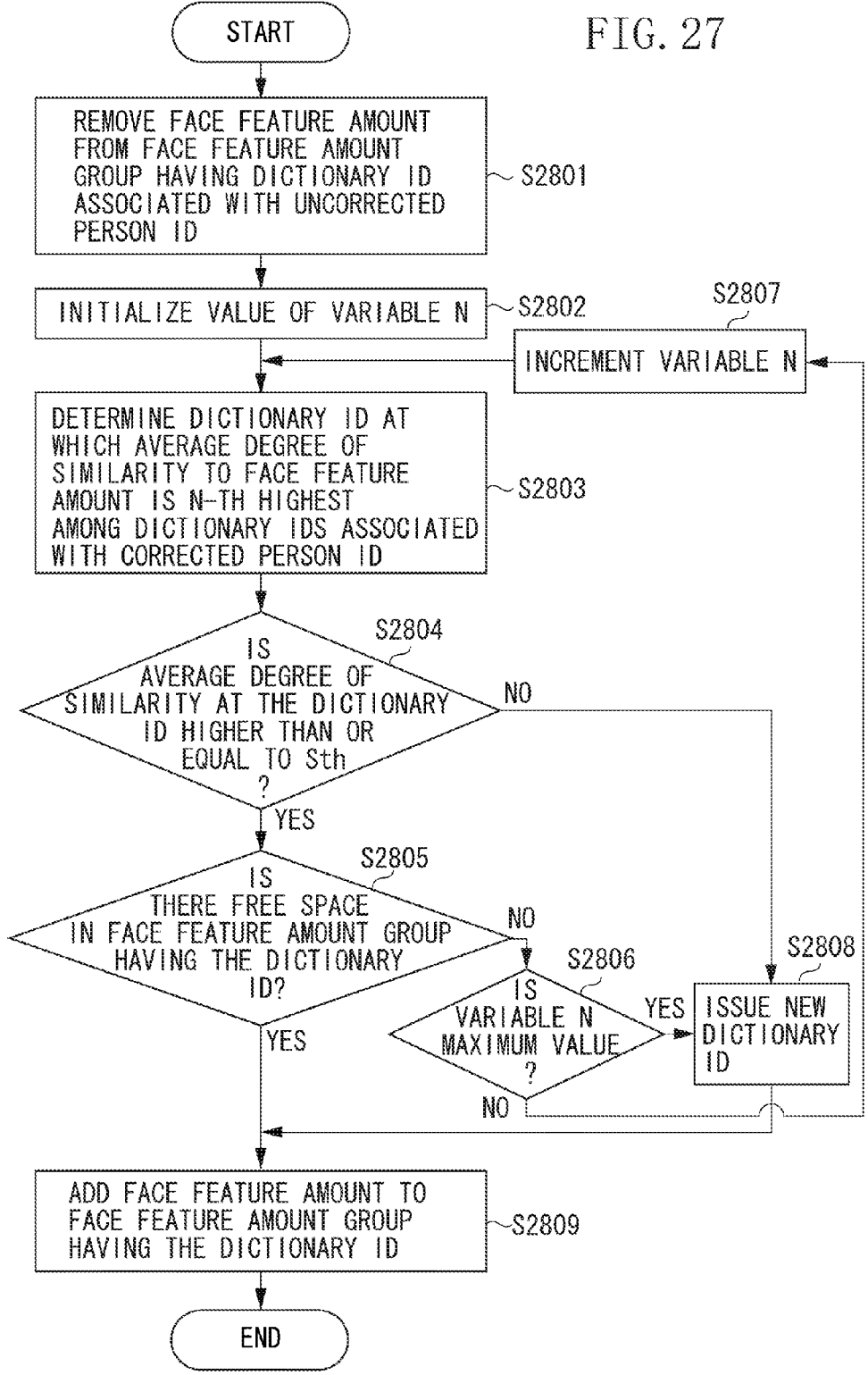

FIG. 28A

| DICTIONARY ID | PERSON ID | FACE FEATURE AMOUNT GROUP | | | | |
|---|---|---|---|---|---|---|
| 1 | father | ▨ | ▨ | ▨ | ▨ | ▨ |
| 2 | father | ▨ | ▨ | ▨ | ▨ | |
| 3 | son | ▨ | | | | |
| 4 | father | ▦ ~2904 | | | | |
| 5 | | | | | | |
| 6 | | | | | | |
| ⋮ | ⋮ | ⋮ | | | | |

FIG. 28B
| 3001 | 3002 | 3004 | |
|---|---|---|---|
| DICTIONARY ID | PERSON ID | FACE FEATURE AMOUNT GROUP | |
| 1 | father |      | |
| 2 | father |      | 3003 |
| 3 | son |  | |
| 4 | father | | |
| 5 | | | |
| 6 | | | |
| ⋮ | ⋮ | ⋮ | |
| | | | |

FIG. 30

| DICTIONARY ID | PERSON ID | FACE FEATURE AMOUNT GROUP | |
|---|---|---|---|
| 1 | father | ▨ ▨ ▨ ▨ ▨ | |
| 2 | father | ▨ ▨ ▨ ▨ | |
| 3 | son | ▨ | |
| 4 | | | |
| 5 | | | |
| 6 | | | |
| ⋮ | ⋮ | ⋮ | |
| | | | |

| DICTIONARY ID | PERSON ID | FACE FEATURE AMOUNT GROUP | SIMILARITY DEGREE THRESHOLD |
|---|---|---|---|
| 1 | father | ▨ ▨ ▨ ▨ ⋯ | 80 |
| 2 | son | ▨ ▨ ▨ ▨ ⋯ | 80 |
| 3 | mother | ▨  3301 | 80 |
| 4 | No Name4 | ▨ ▨ | 80 |
| 5 | No Name5 | ▨ ▨ | 80 |
| 6 | No Name6 | ▨ ▨ ▨ | 80 |
| ⋮ | ⋮ | ⋮ | |

FIG. 31B

| DICTIONARY ID | PERSON ID | FACE FEATURE AMOUNT GROUP | SIMILARITY DEGREE THRESHOLD |
|---|---|---|---|
| 1 | father | ▨ ▨ ▨ ... | 85 |
| 2 | son | ▨ ▨ ▨ ▨ ▦ ... | 80 |
| 3 | mother | ▨  3401 | 80 |
| 4 | No Name4 | ▨ ▨ | 80 |
| 5 | No Name5 | ▨ ▨ | 80 |
| 6 | No Name6 | ▨ ▨ ▨ | 80 |
| ⋮ | ⋮ | ⋮ | |

```xml
<?xml version="1.0" encoding="utf-8"? >
<IMAGEINFO>
    <BaseInfo>
        <ID>0x00000001</ID>
        <ImagePath>C:¥My Picture¥IMG0001.jpg</ImagePath>
        <ImageSize width=3000, height=2000 />
        <CaptureDateTime>20100101:120000<CaptureDateTime>
    </BaseInfo>
    <SensInfo>
        <AveY>122</AveY>
        <AveS>38</AveS>
        <AveH>50</AveH>
        <SceneType>Landscape</SceneType>
        <Person>
            <ID>0</ID>
            <Position>
                <LeftTop x=420, y=200/>
                <LeftBottom x=420, y=300/>
                <RightTop x=520, y=200/>
                <RightBottom x=520, y=300/>
            </Position>
            <AveY>128</AveY>
            <AveCb>-20</AveCb>
            <AveCr>20</AveCr>
        </Person>
        . . .
    </SensInfo>
    <UserInfo>
        <FavoriteRate>3</FavoriteRate>
        <ViewingTimes>5</ViewingTimes>
        <PrintingTimes>3</PrintingTimes>
        <Event>Travel</Event>
    </UserInfo>
    . . .
</IMAGEINFO>
```

FIG. 32B

```xml
<?xml version="1.0" encoding="utf-8" ?>
<PERSONINFO>
        <ID>0</ID>
        <Name>father</Name>
        <Birthday>19700101</Birthday>
        <Relationship>father</Relationship>
</PERSONINFO>
<PERSONINFO>
        <ID>1</ID>
        <Name>son</Name>
        <Birthday>20000101</Birthday>
        <Relationship>son</Relationship>
</PERSONINFO>

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

FIG. 34

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

. . . . . . .

</LayoutInfo>
```

FIG. 35

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

. . . . . . .

</LayoutInfo>
```

FIG. 36

```xml
<?xml version="1.0" encoding="utf-8" ?>
<LayoutInfo>
        <BASIC>
                <Theme>travel</Theme>
                <PageSize>A4</PageSize>
                <Resolution>300</Resolution>
                <MainGroup>son, mother, father</MainGroup>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

FIG. 37

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
                <ImageID>0x00000001</ImageID>
                <TrimmingRatio>50.0</TrimmingRatio>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
                <ImageID>0x00000089</ImageID>
                <TrimmingRatio>38.0</TrimmingRatio>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
                <ImageID>0x00000129</ImageID>
                <TrimmingRatio>53.0</TrimmingRatio>
        </ImageSlot>
            . . . . . . .
</LayoutInfo>
```

APPARATUS AND METHOD FOR MANAGING AN OBJECT EXTRACTED FROM IMAGE DATA

BACKGROUND OF THE INVENTION

Field of the Invention

The present invention relates to an apparatus and a method for managing an object extracted from image data.

Description of the Related Art

As digital still cameras (hereinafter, also referred to as DSCs) and multifunctional mobile phones having a camera function become widespread, the number of digital pictures captured by a user is increasing dramatically. Such data is usually stored in a personal computer (PC) the user owns and/or by using storage services provided on the Internet. As the number of stored pictures increases, there arises a problem that a lot of image viewing operations are needed to find out where desired images are stored. In view of such a problem, a method for detecting faces of persons from a large amount of image data stored by a user, performing a face feature amount analysis on face areas, and automatically grouping the faces of persons who are considered to be the same persons has been discussed (Japanese Patent Application Laid-Open (Translation of PCT Application) No. 2011-516966)).

In the case of automatically grouping the faces of persons considered to be the same persons like Japanese Patent Application Laid-Open (Translation of PCT Application) No. 2011-516966, a challenge has been to improve the accuracy of grouping, or equivalently, the accuracy of individual recognition.

Japanese Patent Application Laid-Open (Translation of PCT Application) No. 2011-516966 discusses providing a unit that displays a warning mark on face information considered likely to have caused misrecognition in a displayed person group, and from which the user inputs whether to accept or reject the face. If the user rejects the face, the face information is hidden from a user interface (UI). However, if new face information similar to the face information considered likely to have caused misrecognition is input during grouping processing, a warning mark appears again.

SUMMARY OF THE INVENTION

The present invention is directed to an apparatus and a method of improved recognition accuracy.

According to an aspect of the present invention, an apparatus includes a first management unit configured to classify and manage feature information of a plurality of objects extracted from image data in units of similar feature information, a second management unit configured to classify and manage the plurality of objects extracted from the image data object by object, an association unit configured to associate the objects in the first management unit with feature information in the second management unit, and an input unit configured to input a correction instruction about classifications of the objects by the second management unit, wherein the second management unit is configured to, if the correction instruction is input by the input unit, correct and manage a classification to which a target object of the correction instruction belongs and the first management unit is configured to change and manage a classification to which a feature information associated with the target object of the correction instruction belongs.

Further features of the present invention will become apparent from the following description of exemplary embodiments with reference to the attached drawings.

BRIEF DESCRIPTION OF THE DRAWINGS

FIG. 22 illustrates a configuration of a face dictionary according to the first exemplary embodiment.

FIGS. 23A and 23B illustrate the configuration of the face dictionary according to the first exemplary embodiment.

FIG. 24 illustrates a configuration of a face dictionary according to a second exemplary embodiment.

FIG. 26 illustrates a configuration of a face dictionary according to a third exemplary embodiment.

FIG. 27 is a flowchart of face dictionary update processing according to the third exemplary embodiment.

FIGS. 28A and 28B illustrate the configuration of the face dictionary according to the third exemplary embodiment.

FIG. 30 illustrates a configuration of a face dictionary according to the fourth exemplary embodiment.

FIGS. 31A and 31B illustrate a configuration of a face dictionary according to a fifth exemplary embodiment.

FIGS. 32A and 32B illustrate examples of formats in which an image analysis result and person attributes are stored.

FIG. 33 illustrates an example of a format in which the layout template of FIG. 13 is stored.

FIG. 34 illustrates an example of a format in which the layout template of FIG. 14 is stored.

FIG. 35 illustrates an example of how a determined theme and main character information are stored.

FIG. 36 illustrates an example of how a determined theme and main character information are stored.

FIG. 37 illustrates an example of how generated layout information is stored.

DESCRIPTION OF THE EMBODIMENTS

A first exemplary embodiment of the present invention for automatically generating a layout output product by using input image groups will be described below. The following description will only exemplify a mode of embodiment, and the present invention is not limited to the following exemplary embodiment.

Figure 1:
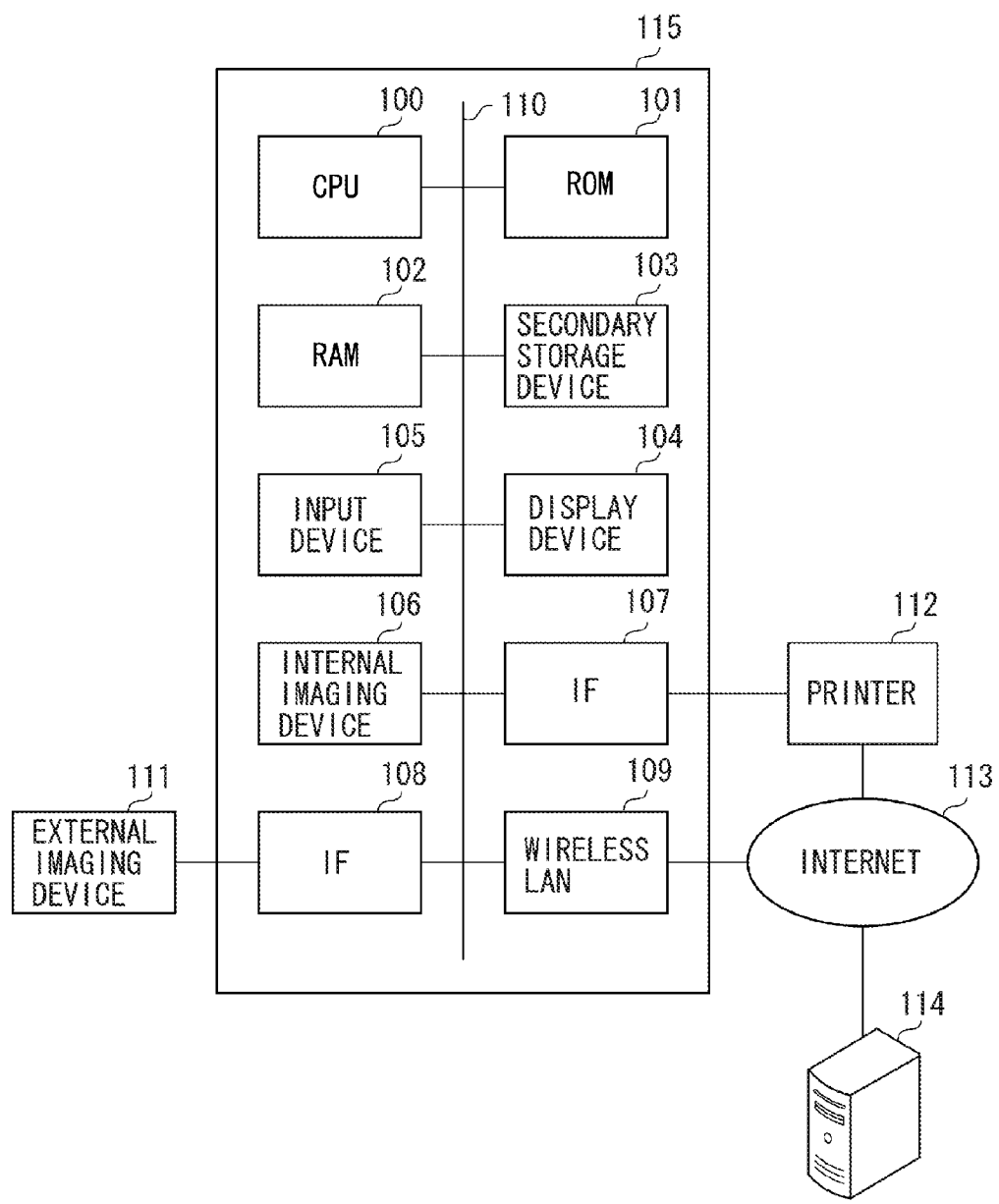
FIG. 1 is a hardware configuration diagram of an image processing apparatus according to a first exemplary embodiment.

FIG. 1 is a block diagram illustrating an example of a hardware configuration of an image processing apparatus according to the first exemplary embodiment.

In FIG. 1, an information processing apparatus 115 includes a central processing unit (CPU) 100, a read-only memory (ROM) 101, a random access memory (RAM) 102, a secondary storage device 103, a display device 104, an input device 105, an interface (IF) 107, an IF 108, and a wireless local area network (LAN) 109. The information processing apparatus 115 further includes an internal imaging device 106. Such components are connected to each other by a control bus/data bus 110. The information processing apparatus 115 of the present exemplary embodiment functions as an image processing apparatus.

An example of the information processing apparatus 115 is a computer. The CPU 110 performs information processing described in the first exemplary embodiment according to a program. The CPU 110 loads a program stored in the secondary storage device 103 and the like to a RAM 102 and runs the program on the RAM 102, thereby controlling the entire image processing apparatus according to the present embodiment. The ROM 101 stores programs such as an application to be described below which is executed by the CPU 100. The RAM 102 provides a memory for temporarily storing various types of information when the CPU 100 executes a program. The secondary storage device 103 is a hard disk. The secondary storage medium 103 is a storage medium for storing image files and a database which stores image analysis results. An example of the display device 104 is a display. The display device 104 is a device for presenting a result of processing of the first exemplary embodiment and UIs to be described below to the user. The display device 104 may include a touch panel function. The input device 105 includes a mouse and/or a keyboard from which the user inputs an instruction for image correction processing.

Images captured by the internal imaging device 106 are subjected to predetermined image processing before stored into the secondary storage device 103. The information processing apparatus 115 can also read image data from an external imaging device 111 which is connected via an interface (IF 108). The wireless LAN 109 is connected to the Internet 113. The information processing apparatus 115 can also acquire image data from an external server 114 which is connected to the Internet 113.

A printer 112 for outputting images is connected to the information processing apparatus 115 via the IF 107. The printer 112 is further connected to the Internet 113 and can exchange print data with the information processing apparatus 115 via the wireless LAN 109.

Figure 2:
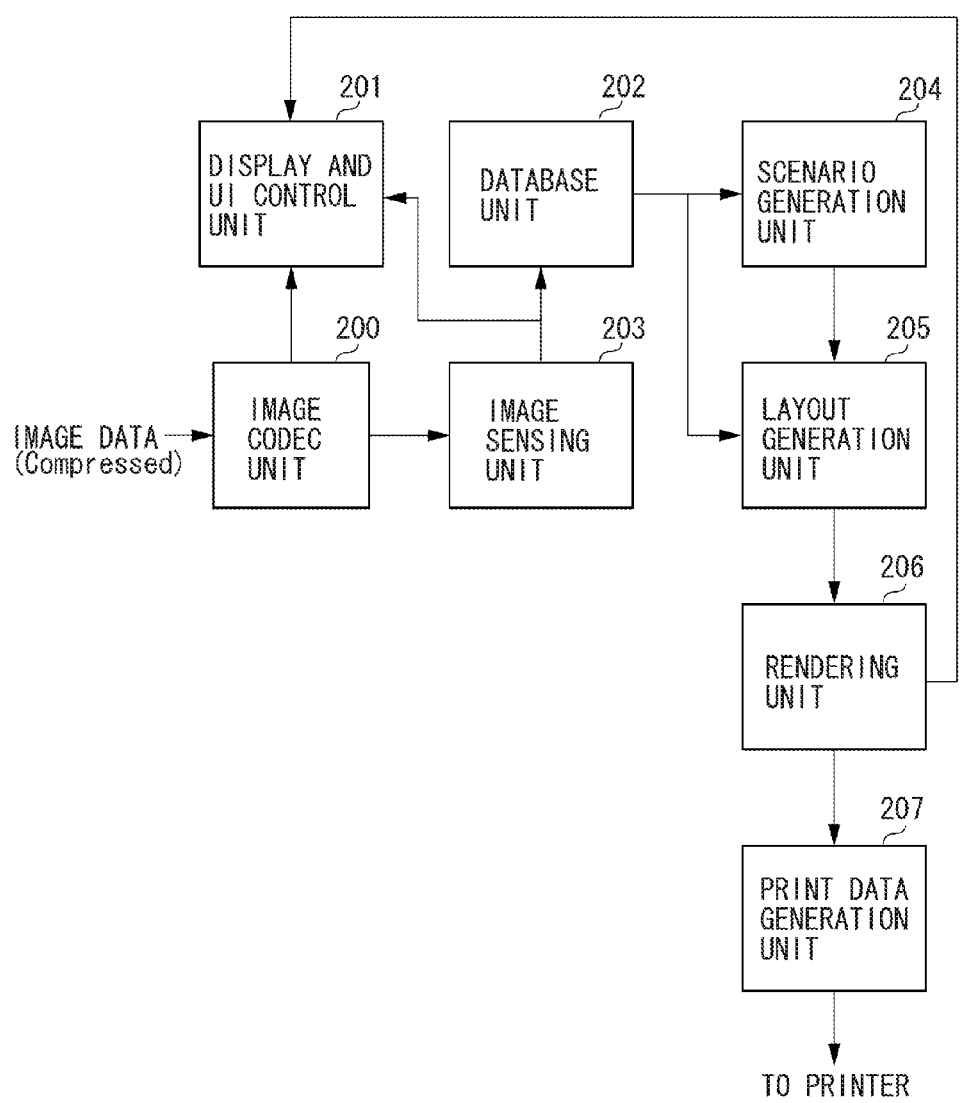
FIG. 2 is a software block diagram according to the first exemplary embodiment.

FIG. 2 is a block diagram illustrating a software configuration of the foregoing application according to the present exemplary embodiment.

Image data acquired by the information processing apparatus 115 is usually in a compression format such as Joint Photography Expert Group (JPEG). An image codec unit 200 decompresses and converts the compression format into a red, green, and blue (RGB) dot sequential bitmap data format. The converted bitmap data is transmitted to a display and UI control unit 201 and displayed on the display device 104 such as a display.

The bitmap data is further input to an image sensing unit 203 (such as an application). As will be described in detail below, the image sensing unit 203 performs various types of analysis processing on images. A database unit 202 stores various types of attribute information about the images, obtained as a result of the analysis processing into the secondary storage device 103 in a predetermined format. In the following description, image analysis processing is synonymous with sensing processing.

A scenario generation unit 204 (application) generates conditions (scenario) of layouts to be automatically generated according to various conditions input by the user. A layout generation unit 205 (application) performs processing for automatically generating layouts according to the scenario.

Based on the generated layouts, a rendering unit 206 generates bitmap data for display. The bitmap data is transmitted to the display and UI control unit 201, and a result is displayed on the display device 104 such as a display. The rendering unit 206 further transmits a rendering result to a print data generation unit 207. The print data generation unit 207 converts the rendering result into printer command data, and transmits the printer command data to the printer 112.

Figure 3:
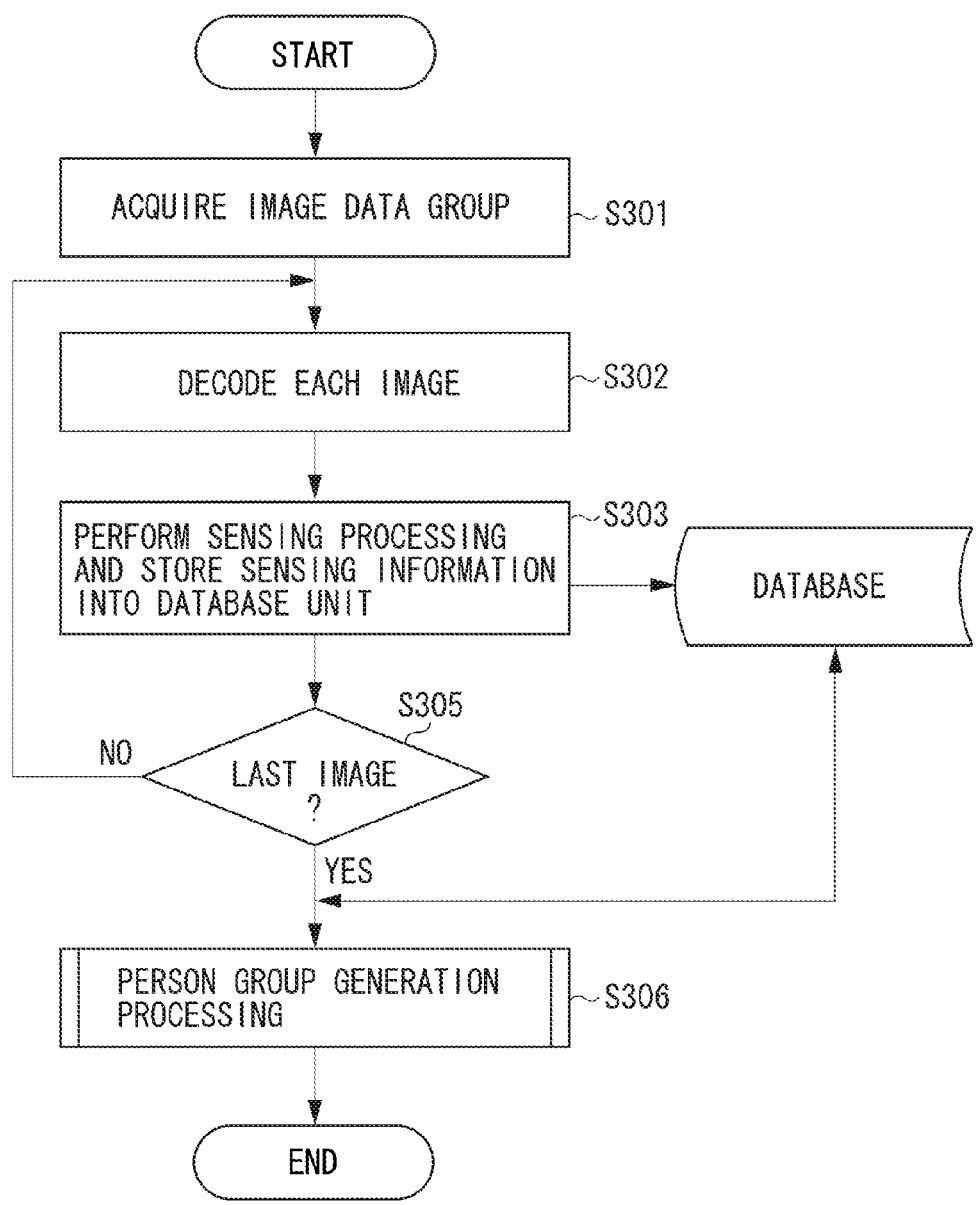
FIG. 3 is a flowchart of image analysis processing according to the first exemplary embodiment.
Figure 4:
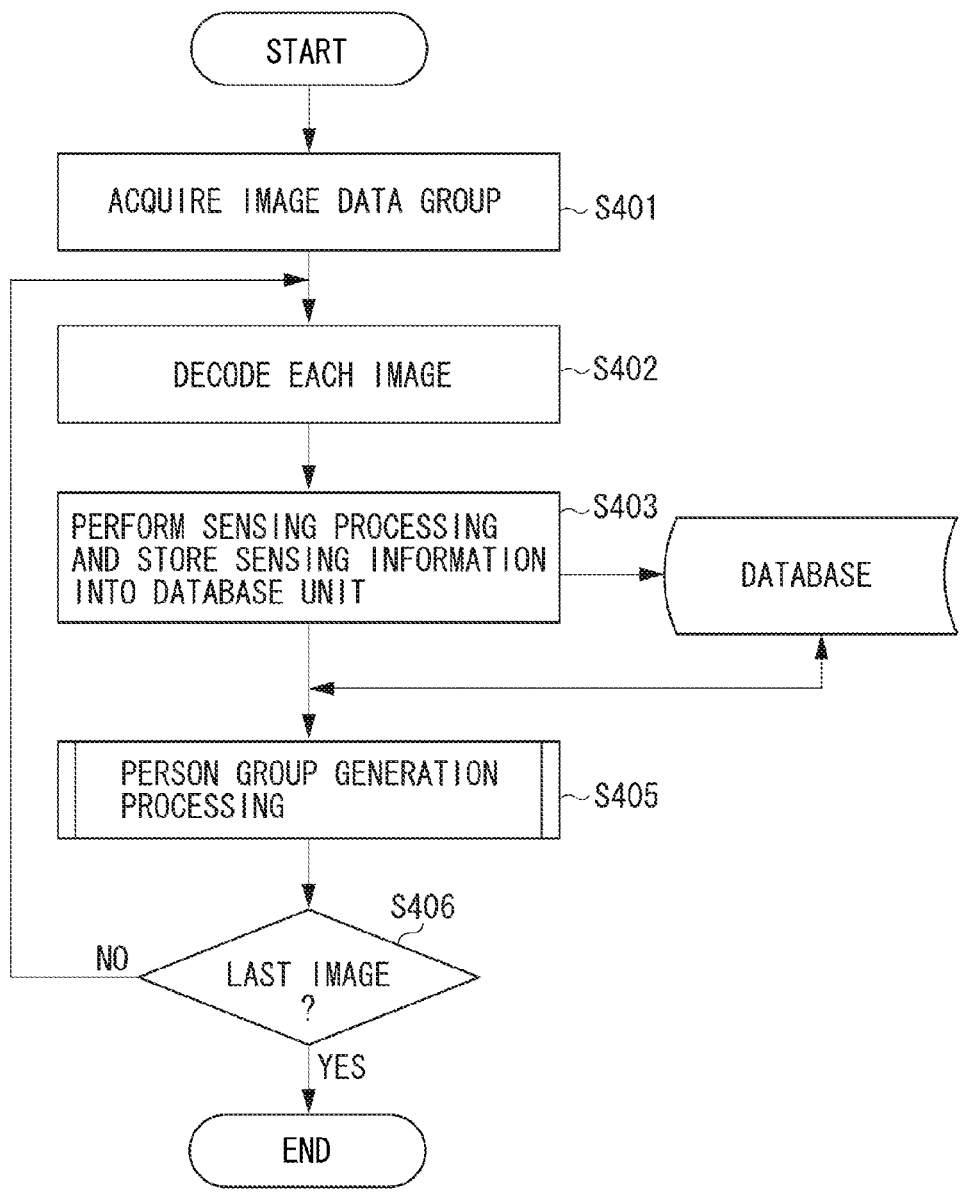
FIG. 4 is a flowchart of image analysis processing according to the first exemplary embodiment.
Figure 5:
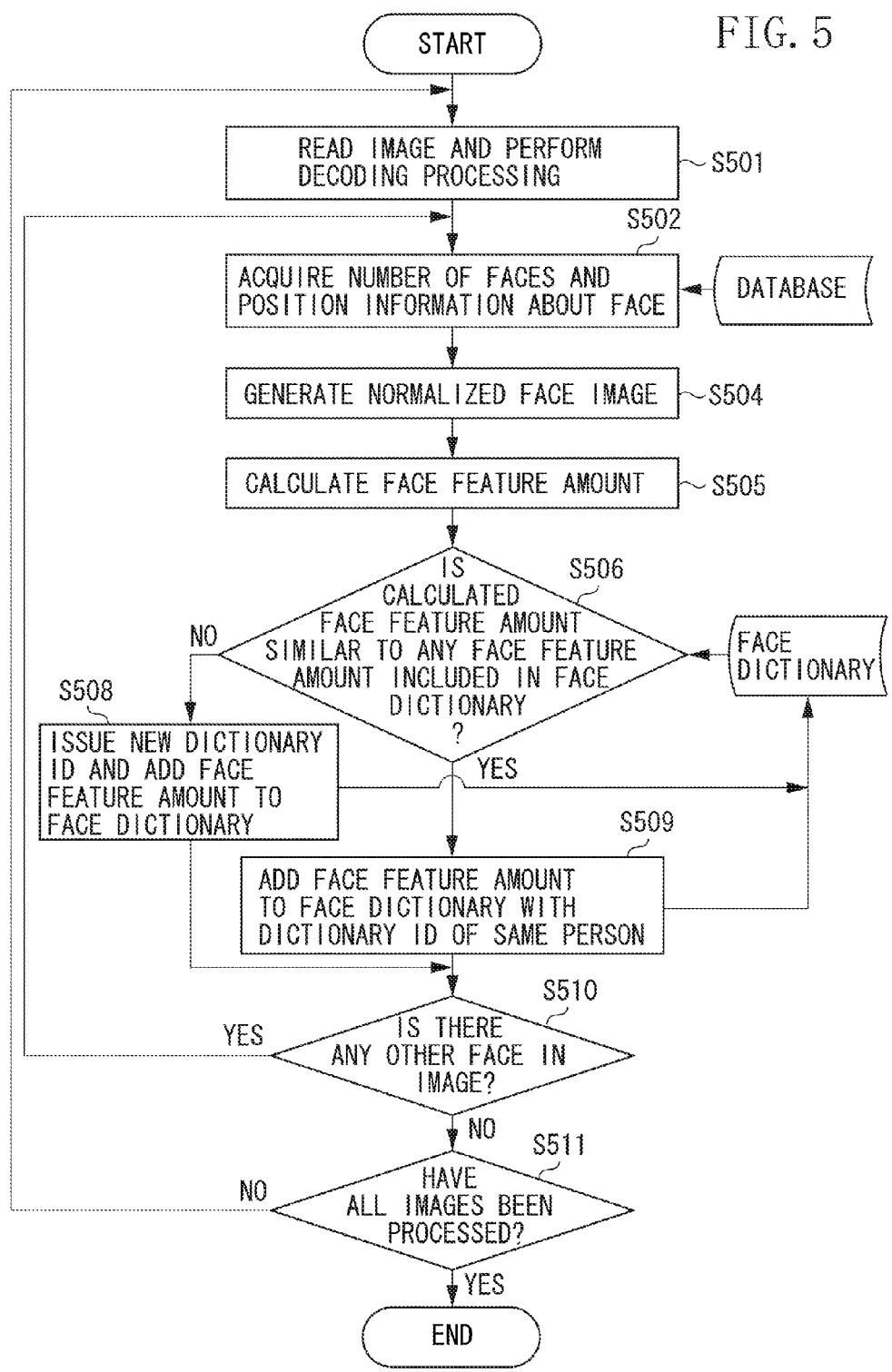
FIG. 5 is a flowchart of person group generation processing according to the first exemplary embodiment.
Figure 6:
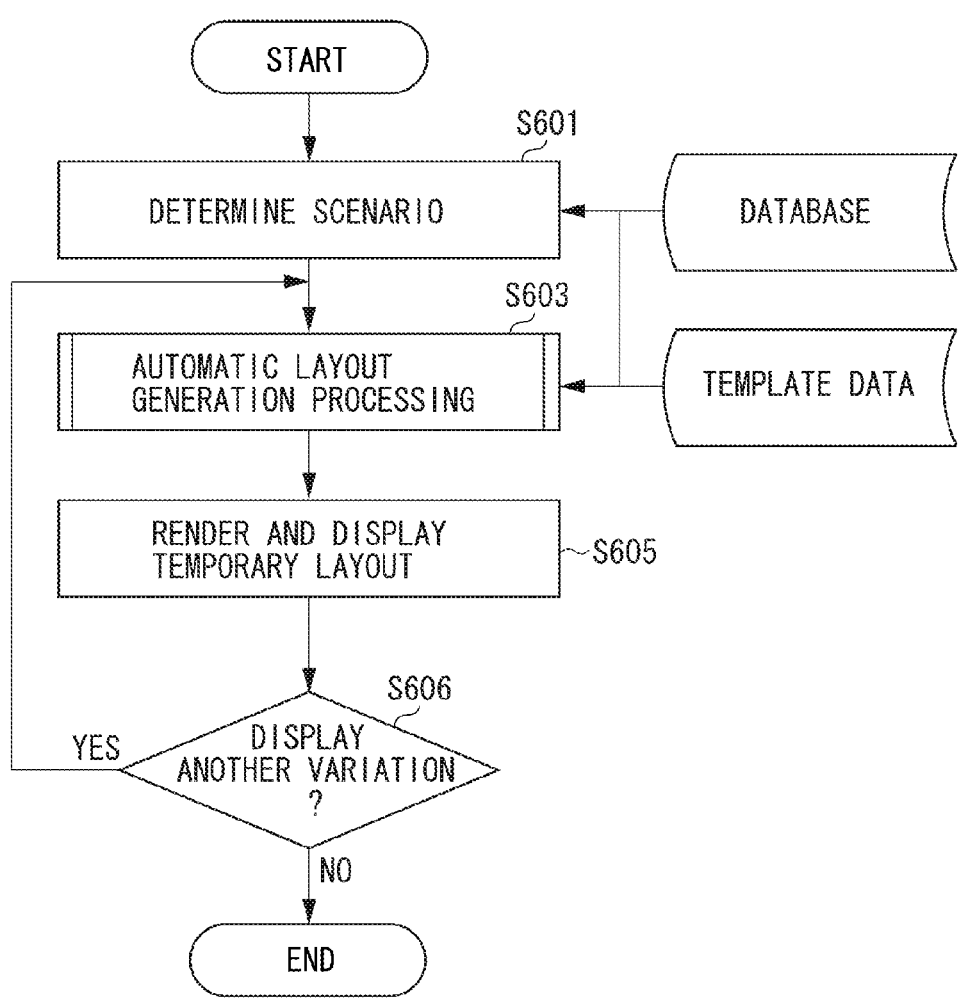
FIG. 6 is a flowchart of automatic layout suggestion processing according to the first exemplary embodiment.

FIGS. 3 to 6 are flowcharts illustrating basic image processing of the application according to the present exemplary embodiment. Specifically, FIGS. 3 and 4 illustrate a flow of the image sensing unit 203, i.e., a processing flow for acquiring a plurality of image data groups, applying analysis processing to each of the image data groups, and storing the result into the database unit 202. FIG. 5 illustrates a processing flow for grouping face information considered to be that of the same persons based on detected face position information. FIG. 6 illustrates a processing flow for determining a scenario for layout generation based on analysis information about images and various types of information input by the user, and automatically generating layouts based on the scenario.

In step S301 of FIG. 3, the image sensing unit 203 acquires an image data group. For example, the user may connect an image capturing apparatus or memory card containing captured images to the information processing apparatus 115, and the image sensing unit 203 may read the captured images from the image capturing apparatus or memory card to acquire an image data group. The image sensing unit 203 may acquire an image data group that has been captured by the internal imaging device 106 and stored in the secondary storage device 103. The image sensing unit 203 may acquire an image data group from a location other than the information processing apparatus 115, like the external server 114 connected to the Internet 113, via the wireless LAN 109.

Figure 8:
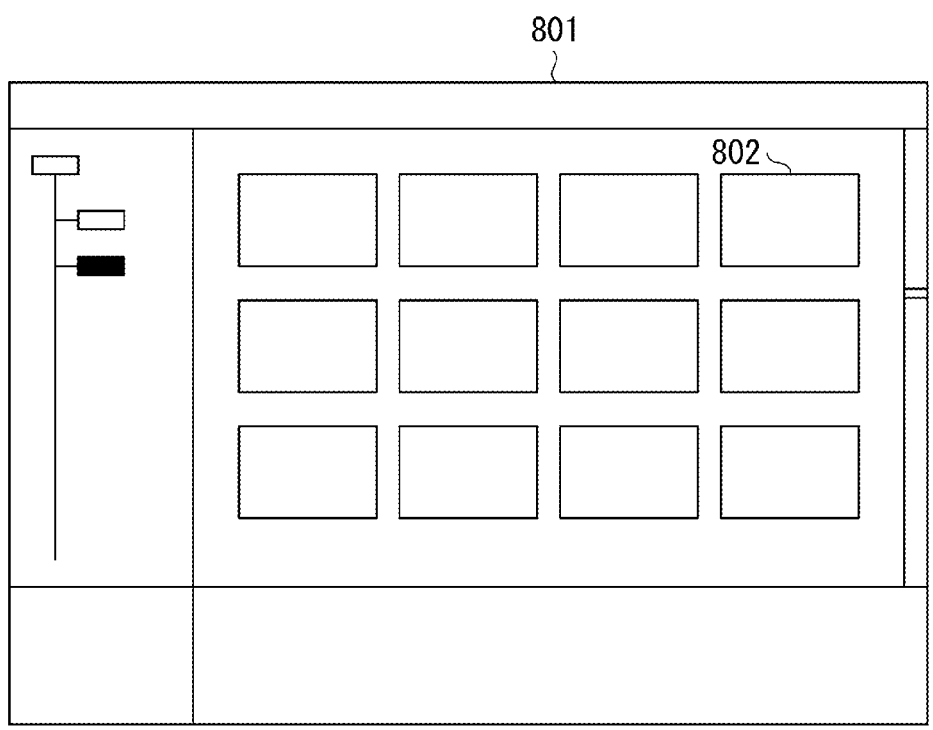
FIG. 8 illustrates a display example of an image group in a thumbnail form of the first exemplary embodiment.
Figure 9:
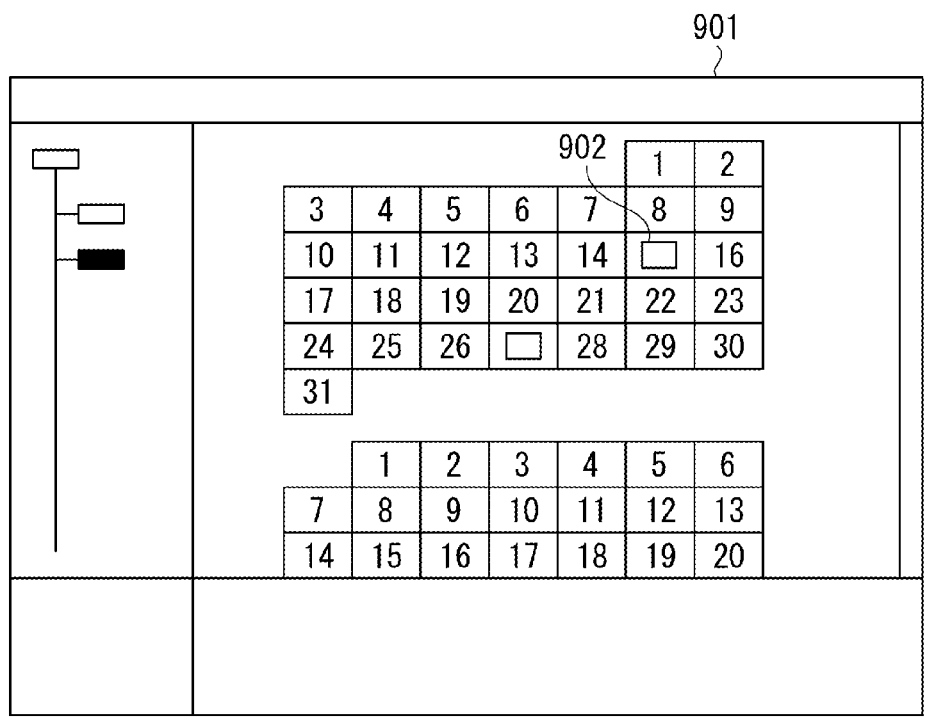
FIG. 9 illustrates a display example of an image group in a calendar form of the first exemplary embodiment.

Acquiring the image data group, the image sensing unit 203 displays a thumbnail group of the image data group on a UI as illustrated in FIGS. 8 and 9. As illustrated in FIG. 8, the image sensing unit 203 may use a UI 801 to display thumbnails 802 of images in units of folders in the secondary storage device 103. As illustrated in FIG. 9, the image sensing unit 203 may use a calendar-like UI 901 to manage image data by date. If the user clicks a date portion 902, the image sensing unit 203 displays images captured on that date in a thumbnail list form as illustrated in FIG. 8.

In step S302, the image sensing unit 203 decodes each image. Specifically, the application searches for a new stored image on which sensing processing has not been performed yet. The image codec unit 200 converts each extracted image from compressed data into bitmap data.

In step S303, the image sensing unit 203 performs various types of sensing processing on the bitmap data. As employed herein, the sensing processing includes various types of processing listed in the following Table 1. In the present exemplary embodiment, examples of the sensing processing include face detection, a feature amount analysis of an image, and a scene analysis. Table 1 shows data types of respective calculation results.

TABLE 1

Examples of Attribute Information Obtained as a Result of Image Analysis

| Sensing category | Sensing subcategory | Data type | Value |
|---|---|---|---|
| Image basic feature amount | Average luminance | int | 0 to 255 |
| | Average saturation | int | 0 to 255 |
| | Average hue | int | 0 to 359 |
| Face detection | Number of human faces | int | 0 to MAXFACE |
| | Coordinate positions | int * 8 | 0 to Width or Height |
| | Average Y in face area | int | 0 to 255 |
| | Average Cb face area | int | −128 to 127 |
| | Average Cr face area | int | −128 to 127 |
| Scene analysis | Scene result | char | Landscape Nightscape Portrait Underexposure Others |

Each type of sensing processing will be described below.

An overall average luminance and average saturation are basic feature information such as basic feature amounts of an image, and can be determined by a known method. A detailed description thereof will thus be omitted. An average luminance can be determined by converting R, G, and B components of each pixel of an image into known luminance and color difference components (for example, Y, Cb, and Cr components; conversion equations are omitted) and averaging the Y components. An average saturation may be determined by calculating the following S of the Cb and Cr components of each pixel and averaging the calculations:

$$S = \sqrt{Cb^2 + Cr^2} \qquad \text{Eq. 1}$$

An average hue (AveH) in an image is a feature amount for evaluating a color tone of the image. The hue of each pixel can be determined by using known hue, intensity, and saturation (HIS) conversion equations. The hues of the entire image can be averaged to determine AveH.

The image sensing unit 203 may calculate such feature amounts of the entire image as described above. The image sensing unit 203 may divide an image into areas of predetermined size, and calculate the feature amounts of each area.

Next, human face detection processing will be described. In the present exemplary embodiment, the image sensing unit 203 may use known techniques for human face detection.

Japanese Patent Application Laid-Open No. 2002-183731 discusses a method that includes detecting an eye area from an input image and assuming a periphery of the eye area as a face candidate area. In the face candidate area, luminance gradients and weights of the luminance gradients are calculated pixel by pixel. The resulting values are compared with gradients and weights of the gradients of an ideal face reference image which is set in advance. If an average angle between the gradients is smaller than or equal to a predetermined threshold, the input image is determined to include a face area.

A method discussed in Japanese Patent Application Laid-Open No. 2003-30667 includes initially detecting a skin color area in an image, and detecting pixels of human iris color in the skin color area to detect eye positions.

A method discussed in Japanese Patent Application Laid-Open No. 8-63597 includes initially calculating matching rates between a plurality of face-shaped templates and an image. A template having the highest matching rate is selected. If the highest matching rate is higher than or equal to a predetermined threshold, the area inside the selected template is set as a face candidate area. The same template can be used to detect eye positions.

In a method discussed in Japanese Patent Application Laid-Open No. 2000-105829, an entire image or a designated area in the image is scanned by using a nose image pattern as a template, and a closest matching position is output as a nose position. Assuming an area above the nose position in the image as an area where eyes exist, the eye-existing area is scanned for matching by using an eye image pattern as a template. This determines an eye existence candidate position set which is a set of pixels where the matching rate is higher than a threshold. Continuous areas included in the eye existence candidate position set are divided into clusters. Distances between the respective clusters and the nose position are calculated. A cluster that minimizes the distance is determined to be a cluster where eyes exist, whereby organ positions can be detected.

Other examples of human face detection methods may include methods for detecting a face or organ position or positions discussed in Japanese Patent Application Laid-Open No. 8-77334, Japanese Patent Application Laid-Open No. 2001-216515, Japanese Patent Application Laid-Open No. 5-197793, Japanese Patent Application Laid-Open No. 11-53525, Japanese Patent Application Laid-Open No. 2000-132688, Japanese Patent Application Laid-Open No. 2000-235648, and Japanese Patent Application Laid-Open No. 11-250267. The human face detection processing may also be performed by a method discussed in Japanese Patent No. 2541688. The human face detection processing is not limited to any particular method.

By the human face detection processing, the image sensing unit 203 can acquire the number of human faces and the coordinate positions of the faces from each input image. Once the coordinate positions of the faces are known, the image sensing unit 203 can analyze the feature amounts of face areas. For example, the image sensing unit 203 can determine average Y, Cb, and Cr values of pixels included in the face areas to acquire the average luminance and average color difference of each face area.

The image sensing unit 203 can also perform scene analysis processing by using feature amounts of an image. For example, the image sensing unit 203 can perform scene analysis processing by using methods discussed in Japanese Patent Application Laid-Open No. 2010-251999 and Japanese Patent Application Laid-Open No. 2010-273144. By the scene analysis processing, the image sensing unit 203 can acquire identifiers (IDs) for identifying captured scenes, including landscape, nightscape, person (portrait), underexposure, and others.

In the present exemplary embodiment, the image sensing unit 203 acquires sensing information by the foregoing sensing processing. However, the image sensing unit 203 may use different sensing information.

The image sensing unit 203 stores the sensing information acquired as described above into the database unit 202. As for a storage format of the database unit 202, the image sensing unit 203 may describe and store the sensing information in a general-purpose format as illustrated in FIGS. 32A and 32B (for example, extensible markup language (XML)).

FIG. 32A illustrates an example where attribute information about each image is described in three separate categories.

The first category, BaseInfo tag, is intended to store information attached to an acquired image file in advance, like an image size and photographing time information. Examples of such information include an identifier ID of each image, a storage location where the image file is stored, an image size, and photographing date and time.

The second category, SensInfo tag, is intended to store results of the foregoing image analysis processing. An average luminance, an average saturation, and an average hue of the entire image, and a result of scene analysis are stored. Information about face positions and face color of persons in the image and also stored.

The third category, UserInfo tag, is a tag that can store information the user has input image by image. The UserInfo tag will be described in detail below.

The method for storing the image attribute information into the database unit 202 is not limited to the foregoing. Such information may be stored in any other format.

In step S305 of FIG. 3, the image sensing unit 203 determines whether the image on which the foregoing processing of steps S302 and S303 has been performed is the last one. If the image is the last one (YES in step S305), the image sensing unit 203 proceeds to step S306. If the image is not the last one (NO in step S305), the image sensing unit 203 returns to step S302.

In step S306, the image sensing unit 203 performs processing for generating groups person by person by using face position information detected in step S303. Automatically grouping human faces in advance can make the user's subsequent operation for naming persons more efficient.

Here, the image sensing unit 203 generates person groups by using an individual recognition method according to the processing flow of FIG. 5.

Note that individual recognition processing is mostly performed by extracting feature amounts of facial organs such as eyes and a mouth, and comparing degrees of similarity of relationship between such feature amounts. An example of the individual recognition processing is discussed in Japanese Patent No. 3469031. A detailed description thereof will thus be omitted.

FIG. 5 is a basic flowchart of person group generation processing in step S306.

In step S501, the image sensing unit 203 reads an image stored in the secondary storage device 103 in order and performs decoding processing. In step S502, the image sensing unit 203 accesses the database unit 202 to acquire the number of faces included in the image and position information about a face. In step S504, the image sensing unit 203 generates a normalized face image for performing the individual recognition processing.

An image may include faces of various sizes, orientations, and resolutions. Normalized face images refer to face images that are transformed and cut out to a predetermined size and orientation. For the purpose of individual recognition, the positions of organs such as eyes and a mouth are important. Normalized face images therefore desirably have a size such that the foregoing organs can be reliably recognized. The generation of such normalized face images eliminates the need to handle faces of various resolutions during feature amount detection processing.

In step S505, the image sensing unit 203 calculates face feature information such as a face feature amount from the normalized face image. As employed herein, a face feature amount characteristically includes the positions and sizes of organs such as eyes, a mouth, and a nose, and the outline of the face.

In step S506, the image sensing unit 203 determines whether the calculated face feature amount is similar to face feature amounts stored in a database (hereinafter, referred to as a face dictionary) in which face feature amounts are stored with respect to each person's identifier (dictionary ID) in advance. For example, the image sensing unit 203 compares a feature amount managed in the face dictionary with the new input feature amount to calculate a degree of similarity. The feature amounts to be used here include stored information about the positions of organs such as eyes, a nose, and a mouth, and distances between the organs. The more similar the foregoing feature amounts are, the higher the value of the degree of similarity is. The less similar the foregoing feature amounts are, the lower the value the degree of similarity. For example, possible values of the degree of similarity are 0 to 100. The image sensing unit 203 determines whether the face feature amounts are similar by comparing the calculated degree of similarity with a threshold retained in advance. If the degree of similarity is higher than the threshold (YES in step S506), the image sensing unit 203 determines that the person is the same person as the one having the dictionary ID. If the degree of similarity is lower than or equal to the threshold (NO in step S506), the image sensing unit 203 determines that the person is not the same person. One fixed threshold for such a similarity degree determination may be retained for all of the dictionary IDs. Different thresholds may be retained for respective dictionary IDs.

If YES in step S506, the image sensing unit 203 proceeds to step S509. In step S509, determining that the person is the same person, the image sensing unit 203 adds the face feature amount to the face dictionary with the dictionary ID of the same person.

If NO in step S506, the image sensing unit 203 proceeds to step S508. In step S508, determining that the face under evaluation is of a person different from those who have been registered in the face dictionary, the image sensing unit 203 issues a new dictionary ID and adds the face feature amount to the face dictionary. The image sensing unit 203 applies the processing of steps S502 to S509 to all face areas detected from the input image group, thereby grouping persons who have appeared.

The image sensing unit 203 writes the result of the person group generation processing face by face by using ID tags as illustrated by an XML format of FIG. 32B, and stores the resultant into the database.

FIG. 22 illustrates the contents of the face dictionary generated by the person group generation processing. In FIG. 22, face feature amounts in a face feature amount group 2203 managed by the same dictionary ID 2201 are those of faces that are determined to be of the same person.

In the exemplary embodiment described above, the image sensing unit 203 performs the person group generation processing after the end of the sensing processing of all the images as illustrated in FIG. 3. However, other methods may be employed. For example, as illustrated in FIG. 4, the image sensing unit 203 may repeat performing the sensing processing on an image in step S403 and then performing the person group generation processing in step S405 by using face detection position information. This can produce the same result.

Figure 7:
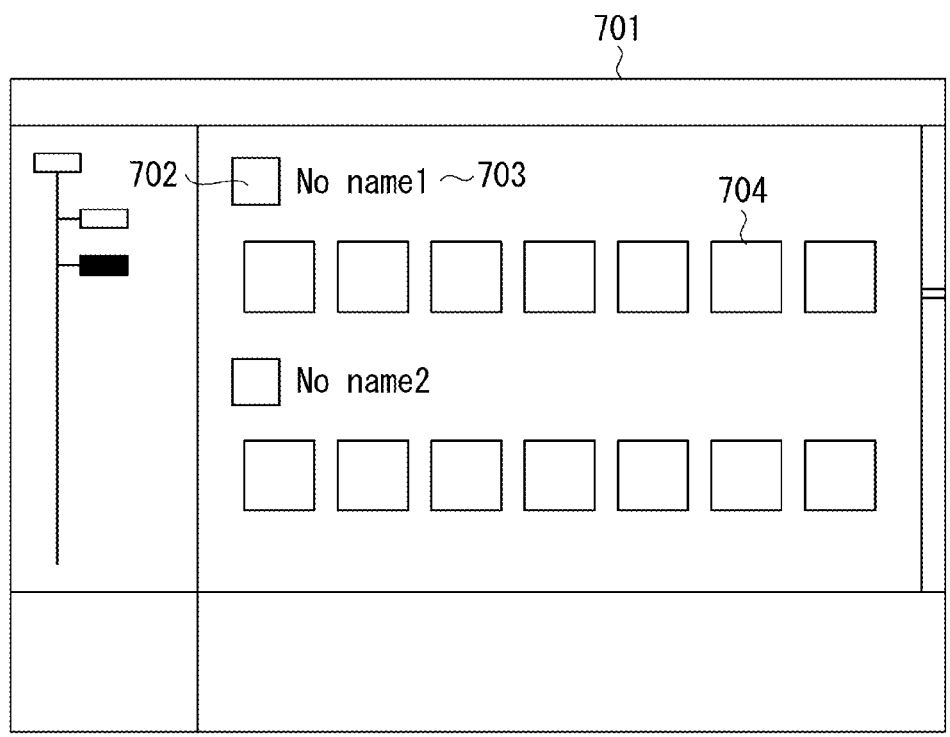
FIG. 7 illustrates a display example of person groups of the first exemplary embodiment.

FIG. 7 illustrates a UI 701 which displays the person groups obtained by the person group generation processing. In FIG. 7, a representative face image 702 of a person group is displayed next to an area 703 where a name of the person group is displayed. Immediately after the end of automatic person group generation processing, person names such as "No name1" and "No name2" are displayed as illustrated in FIG. 7. Hereinafter, such person names will be referred to as person IDs. A plurality of face images 704 is included in the person group. As will be described below, the UI 701 of FIG. 7 enables the user to designate an area 703 of "No name X" and input a person name, and/or input information such as a birthday and relationship person by person.

As illustrated in FIG. 22, the dictionary IDs 2201 and the person IDs 2202 are managed in association with (as linked with) each other.

The image sensing unit 203 may perform the foregoing sensing processing by utilizing a background task of an operating system. In such a case, the image sensing unit 203 can continue the sensing processing of an image group or groups while the user performs other operations on the computer.

In the present exemplary embodiment, the user can manually input various types of attribute information about images.

Table 2 lists examples of such attribute information (hereinafter, referred to as manual registration information). Manual registration information is broadly classified into two categories: information to be set in units of images and information to be set for persons grouped by the foregoing person group generation processing.

TABLE 2

Examples of Attribute Information User Can Manually Input

| Category | Item | Data type | Value |
|---|---|---|---|
| Image | Satisfaction rating | int | 0 to 5 |
| | Event | char | "travel" "graduation" |

TABLE 2-continued

Examples of Attribute Information User Can Manually Input

| Category | Item | Data type | Value |
|---|---|---|---|
| | | | "wedding" |
| Person | Name | char | "NAME" |
| | Birthday | char | YYYYMMDD |
| | Relationship | char | "family" "" |

Figure 10:
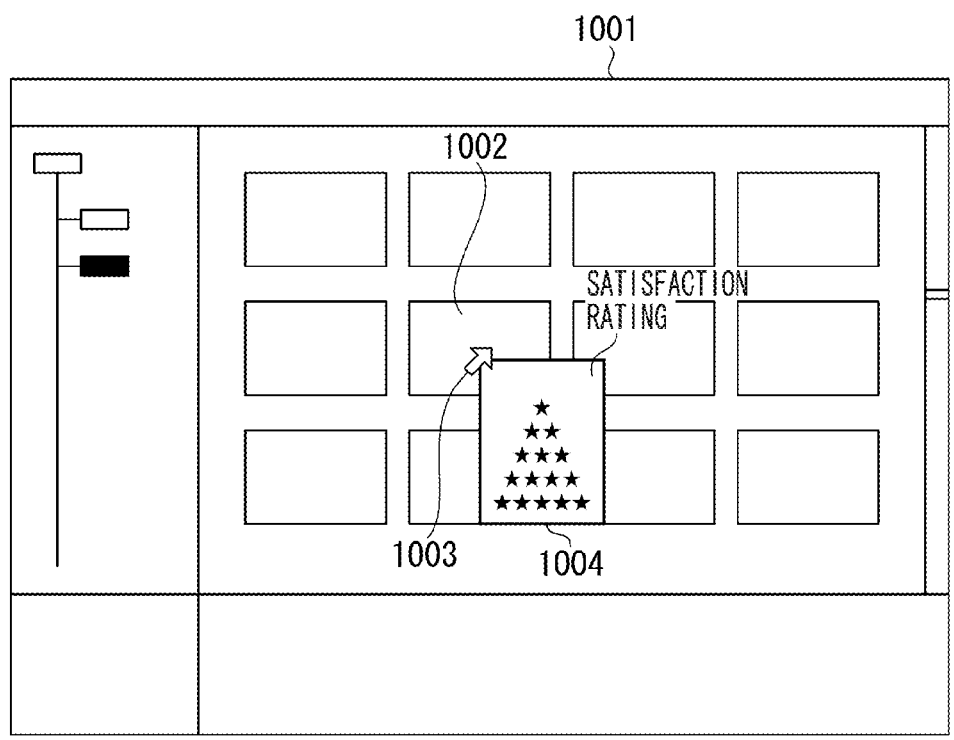
FIG. 10 illustrates an example of a UI for manually inputting a satisfaction rating.

An example of the attribute information set image by image is the user's satisfaction rating. The satisfaction rating enables the user to manually input whether he/she likes the image in a stepwise fashion. For example, as illustrated in FIG. 10, the user selects a desired thumbnail image 1002 on a UI 1001 by using a mouse pointer 1003, and right-clicks to display a dialog that enables input of the satisfaction rating. The user can select the number of stars on the menu according to his/her preference. In the present exemplary embodiment, the higher the satisfaction rating, the greater the number of stars the user sets.

The image sensing unit 203 may automatically set satisfaction ratings without the user's manual setting. For example, suppose that the user clicks on a desired image file in the state of a list view of image thumbnails illustrated in FIG. 8 to enter a single-image display screen. The image sensing unit 203 may count the number of times of such screen transitions and set the satisfaction rating according to the number. For example, the more frequently an image is viewed, the more the image is determined to be favored by the user.

In another example, the image sensing unit 203 may use the number of times of printing as a satisfaction rating. For example, when the user prints an image, the image sensing unit 203 may set the satisfaction rating of the image to be high, considering that the user likes the image. In such a case, the image sensing unit 203 counts the number of times of printing, and sets the satisfaction rating according to the number of times of printing.

As has been described above, the user may manually set a satisfaction rating. The image sensing unit 203 may set a satisfaction rating according to the number of views or according to the number of times of printing. By using an XML format as illustrated in FIG. 32A, the image sensing unit 203 separately stores such settings and measured information into a UserInfo tag in the database unit 202. For example, the image sensing unit 203 stores the satisfaction rating with a FavoriteRate tag, the number of views with a ViewingTimes tag, and the number of times of printing with a PrintingTimes tag.

Another example of the information set image by image is event information. Examples of event information include a family trip "travel," a commencement or continuation ceremony "graduation," and a wedding ceremony "wedding."

Figure 11:
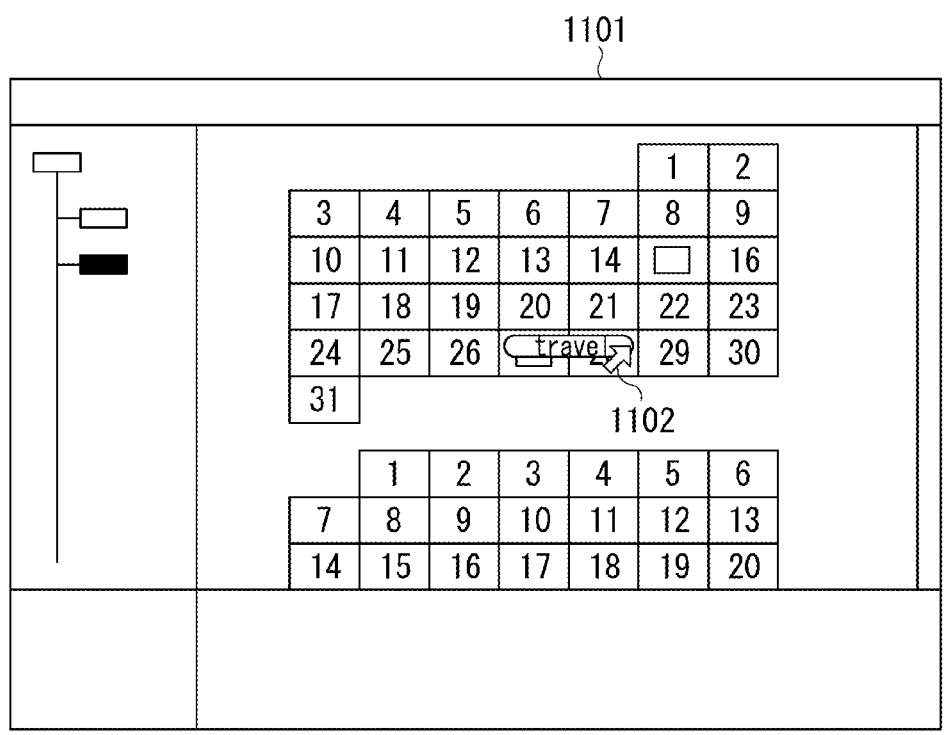
FIG. 11 illustrates an example of a UI for manually inputting event information.

As illustrated in FIG. 11, the user may specify an event by designating a desired date on a calendar by using a mouse pointer 1102 and inputting an event name of that date. The specified event name is included in the XML format illustrated in FIG. 32A as a part of the attribute information about the image. In the XML format of FIG. 32A, an Event tag in the UserInfo tag is used to link the event name and the image. Hereinafter, "to link" means "to associate."

Next, attribute information about a person will be described.

Figure 12:
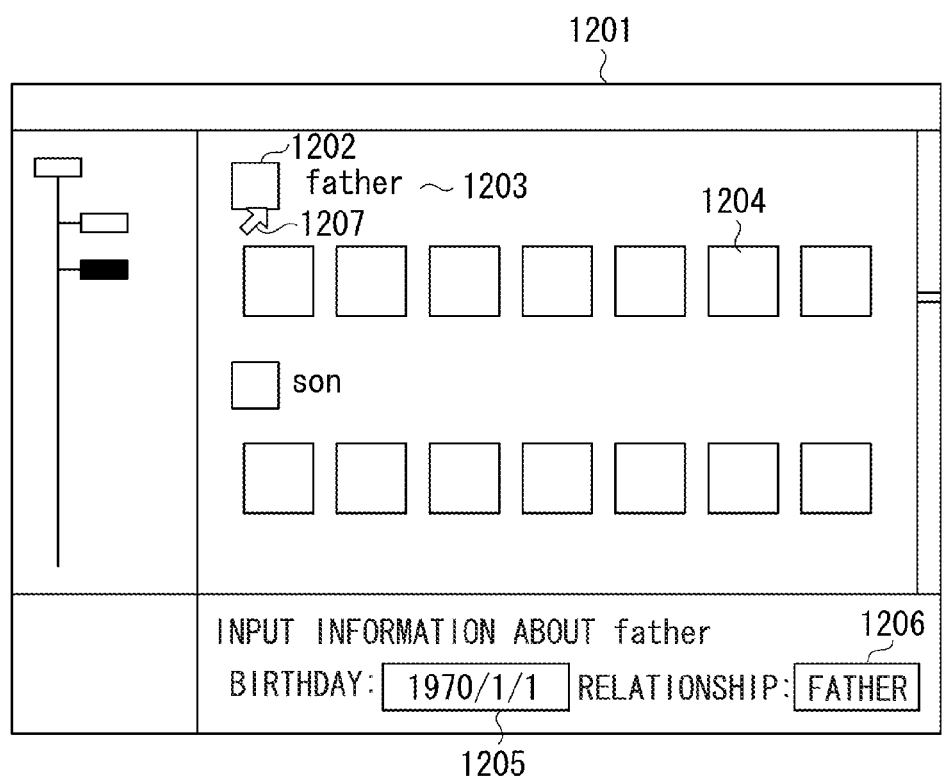
FIG. 12 illustrates an example of a UI for manually inputting person attribute information.

FIG. 12 illustrates a UI for inputting attribute information about a person. In FIG. 12, a representative face image 1202 of a given person (in this case, "father") is displayed next to a display area 1203 of a person name (person ID) of the given person. Images (thumbnails) 1204 are ones that are detected from other images and determined to have similar face feature amounts in step S506. In FIG. 12, the images 1204 determined to have similar face feature amounts in step S506 are displayed in a list form under the person ID 1203.

Immediately after the end of the sensing processing, as illustrated in FIG. 7, the person groups have no name input. The user can designate a "No name" portion 703 with a mouse pointer to input an arbitrary person name.

Each person's birthday and relationship to the user who operates the application may be set as attribute information about the person. The user can click a representative face image 1202 of a person in FIG. 12 to input the birthday of the clicked person in a first input section 1205 as illustrated at the bottom of the screen. The user can also input relationship information about the clicked person in a second input section 1206.

Unlike the foregoing attribute information associated with images, such input person attribute information is managed in the database unit 202 separately from the image attribute information by using an XML format as illustrated in FIG. 32B.

As illustrated in FIG. 23A, the set person names (person IDs 2302) may be linked with and managed by dictionary IDs separately from the XML format.

Figure 13:
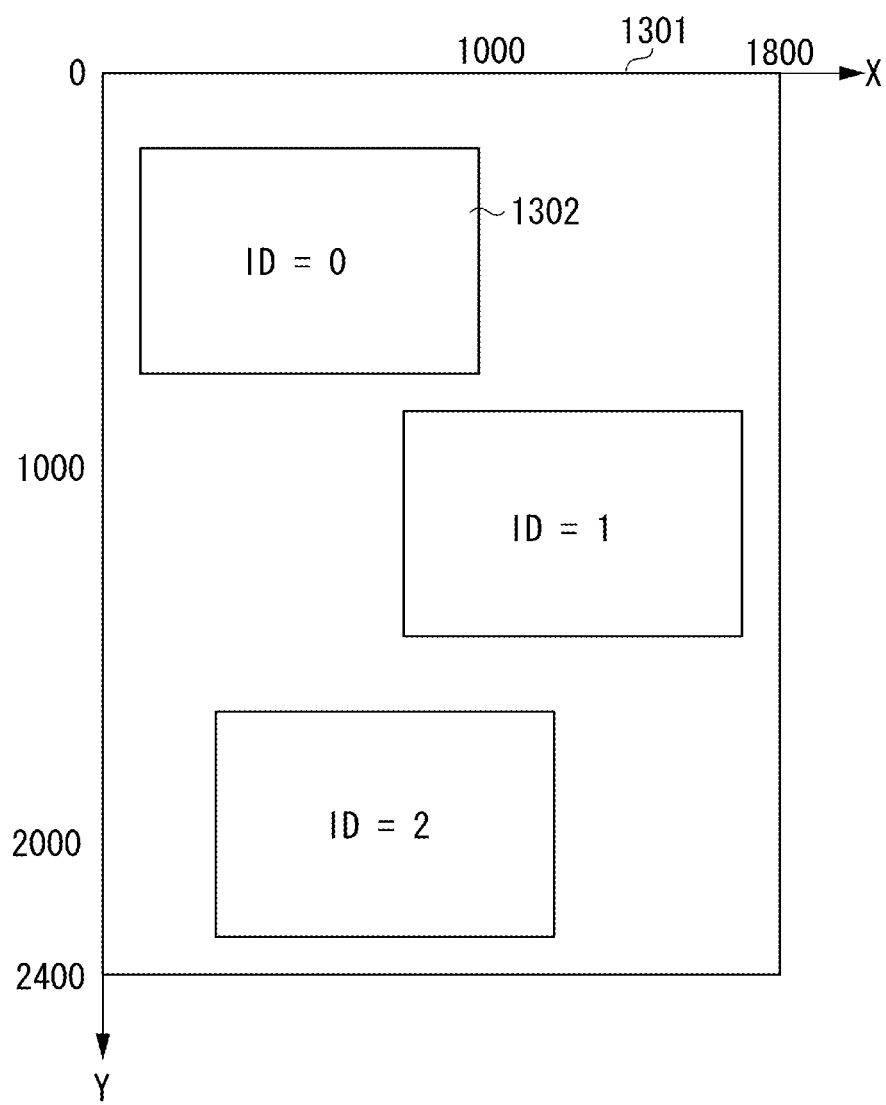
FIG. 13 illustrates an example of a layout template.
Figure 14:
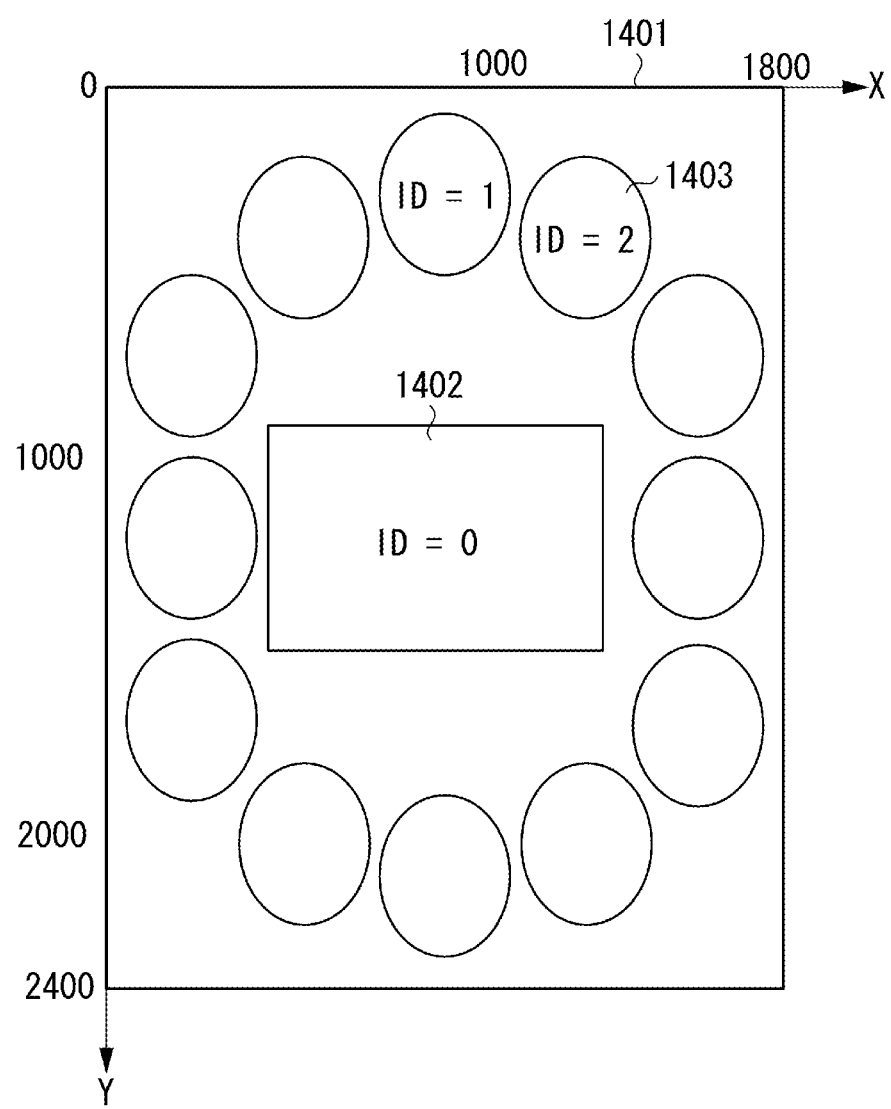
FIG. 14 illustrates an example of a layout template.

In the present exemplary embodiment, the layout generation unit 205 performs layout generation processing by using various layout templates prepared in advance. Layout templates refer to ones such as illustrated in FIGS. 13 and 14. A layout template includes a plurality of image layout frames (hereinafter, synonymous with slots) 1302, 1402, and/or 1403 within a layout sheet size.

There are prepared a large number of such templates. The templates may be stored in the secondary storage device 103 in advance when software for implementing the present exemplary embodiment is installed on the information processing apparatus 115. Alternatively, the layout generation unit 205 may acquire an arbitrary template group from the external server 114 located on the Internet connected via the IF 107 and/or the wireless LAN 109.

The templates may be written in a highly-versatile structured language. Examples include XML which is used to store the foregoing sensing results. FIGS. 33 and 34 illustrate examples of XML data.

In such examples, basic information about a layout page is written with a BASIC tag. Examples of the basic information include the layout's theme, page size, and page resolution (dpi). In the examples, a Theme tag, which describes a layout theme, is blank when the templates are in an initial state. A page size of A4 and a resolution of 300 dpi are set as basic information.

ImageSlot tags describe information about the foregoing image layout frames. An ImageSlot tag contains two tags, namely, an ID tag and a POSITION tag which describe an ID and position of an image layout frame. As illustrated in FIGS. 13 and 14, such position information is defined, for example, in an X-Y coordinate system with an origin at the top left.

The ImageSlot tags also set a slot shape and a recommended person group name to be arranged for the respective slots. For example, the template of FIG. 13 recommends that all slots have a rectangular shape "rectangle" as described by the Shape tags of FIG. 33, and a person group name "MainGroup" be arranged for all the slots as described by the PersonGroup tags.

As illustrated in FIG. 34, the template of FIG. 14 describes that a slot of ID=0 arranged in the center has a rectangular shape, with "SubGroup" as a person group. The other slots of ID=1, 2, . . . are recommended to have an "ellipse" shape with "MainGroup" as a person group each.

In the present exemplary embodiment, a large number of such templates are retained.

The application according to the present exemplary embodiment can perform analysis processing on input image groups, automatically group persons, and display the result on a UI. Viewing the result, the user can input attribute information such as a name and a birthday for each person group, and/or set a satisfaction rating for each image. The application can also retain a large number of layout templates classified by theme.

Satisfying the foregoing conditions, the application of the present exemplary embodiment performs, at predetermined timing, processing for automatically generating collage layouts that the user may like and presenting the collage layouts to the user (hereafter, referred to as layout suggestion processing).

FIG. 6 illustrates a basic flowchart for performing the layout suggestion processing.

In step S601, the scenario generation unit 204 determines a scenario of the layout suggestion processing. A scenario includes information about determination of a theme and a template of a layout to suggest, setting of a person (main character) to place emphasis on in the layout, and selection of image groups to be used for layout generation.

A method for determining a scenario will be described below in conjunction with two scenario examples.

Suppose, for example, that processing for suggesting a layout of a birthday of each person is set to be automatically performed two weeks before. Suppose also that the first birthday of a person who is automatically grouped as "son" in FIG. 12 is approaching. In such a case, the scenario generation unit 204 determines a theme of the layout to be a growth record "growth". The scenario generation unit 204 then selects a template. Here, the scenario generation unit 204 selects one suitable for a growth record like FIG. 14, and writes "growth" to the Theme tag portion of the XML as illustrated in FIG. 35. The scenario generation unit 204 then sets "son" as a main character "MainGroup" to place emphasis on during layout. The scenario generation unit 204 sets "son" and "father" as "SubGroup" to place a secondary emphasis on during layout. The scenario generation unit 204 then selects image groups to be used for layout. In the case of this example, the scenario generation unit 204 refers to the database unit 202, extracts a large number of image groups including "son" from image groups that have been captured since the birthday of the person "son," and generates a list of the extracted image groups. The scenario generation unit 204 thereby determines a scenario for a growth record layout.

As another example, suppose that the layout suggestion processing is set to be performed if predetermined event information has been registered within a month. If the event information registered in FIG. 11 shows that there was a family trip several days before and a large number of images of the family trip are stored in the secondary storage device 103, the scenario generation unit 204 determines a scenario for suggesting a layout of a family trip. In such a case, the scenario generation unit 204 determines a theme of the layout (as suggested) to be "travel." The scenario generation unit 204 then selects a template. In this case, the scenario generation unit 204 selects a layout like FIG. 13, and writes "travel" to the Theme tag portion of the XML as illustrated in FIG. 36. The scenario generation unit 204 then sets "son," "mother," and "father" as main characters in "MainGroup" to place emphasis on during layout. By utilizing a characteristic of the XML, the scenario generation unit 204 can thus set a plurality of persons as "MainGroup."

Next, the scenario generation unit 204 selects image groups to be used for layout. In the case of this example, the scenario generation unit 204 refers to the database unit 202, extracts a large number of image groups linked with the foregoing travel event, and generates a list of the extracted image groups. The scenario generation unit 204 thereby determines a scenario for a family trip layout.

Figure 15:
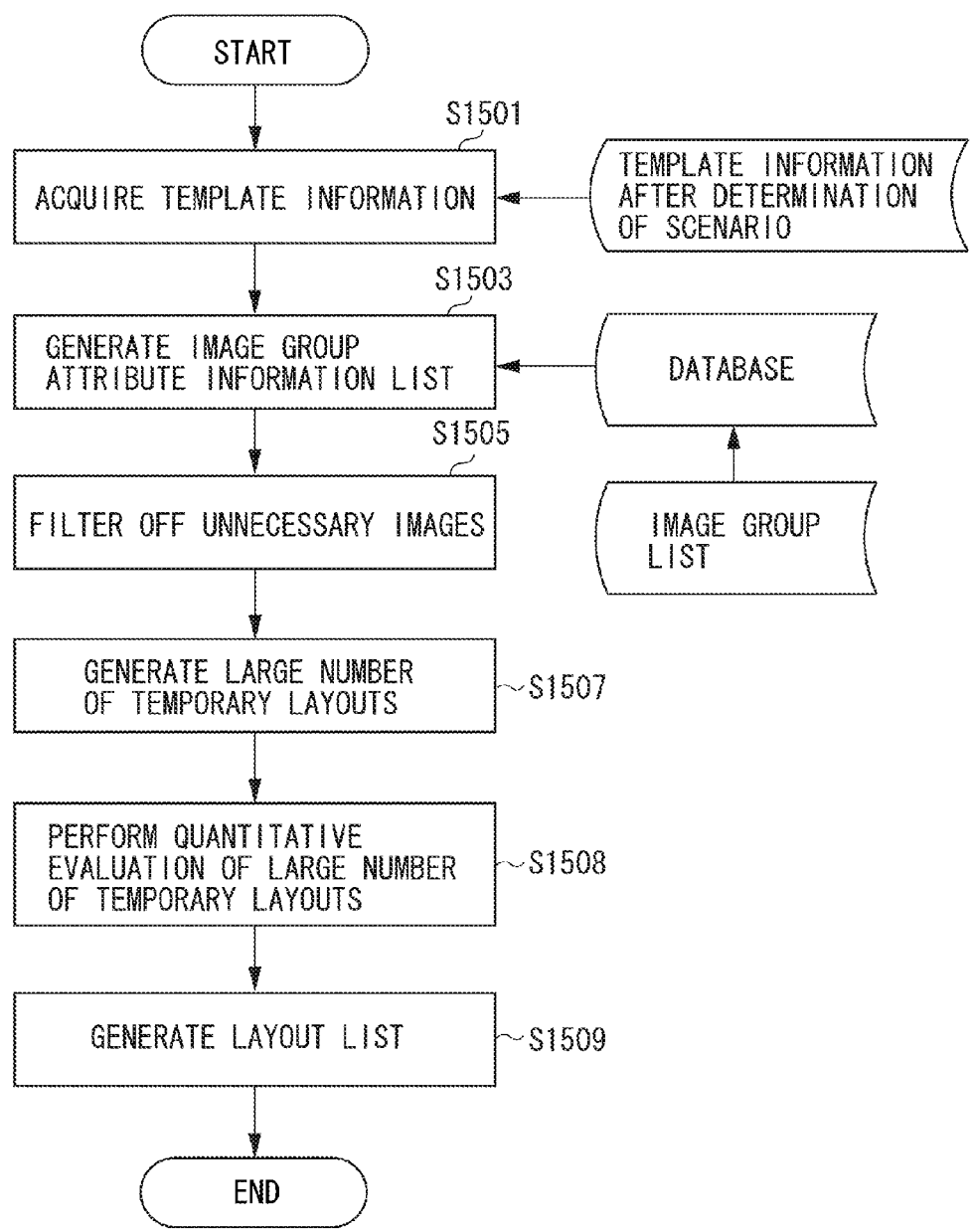
FIG. 15 is a flowchart of automatic layout generation processing according to the first exemplary embodiment.

In step S603 of FIG. 6, the layout generation unit 205 performs automatic layout generation processing based on the scenario described above. FIG. 15 illustrates a detailed processing flow of the layout generation unit 205. Referring to FIG. 15, the processing steps will be described below.

In step S1501, the layout generation unit 205 acquires template information that is determined by the foregoing scenario determination processing and includes the theme and person group information.

In step S1503, the layout generation unit 205 acquires feature amounts of images from the database unit 202 image by image to generate an image group attribute information list based on an image group list determined by the scenario. As employed herein, the image group attribute information list includes an IMAGEINFO tag illustrated FIG. 32A as many as images included in the image group list.

As can be seen, the automatic layout generation processing of the present exemplary embodiment will not directly handle image data itself, but uses the attribute information that has been stored in the database unit 202 by performing the sensing processing on each image in advance. The reason is to avoid needing an extremely large memory area for storing image groups when handling image data itself. As a result, the amount of memory needed for the automatic layout generation processing can be reduced.

Figure 16:
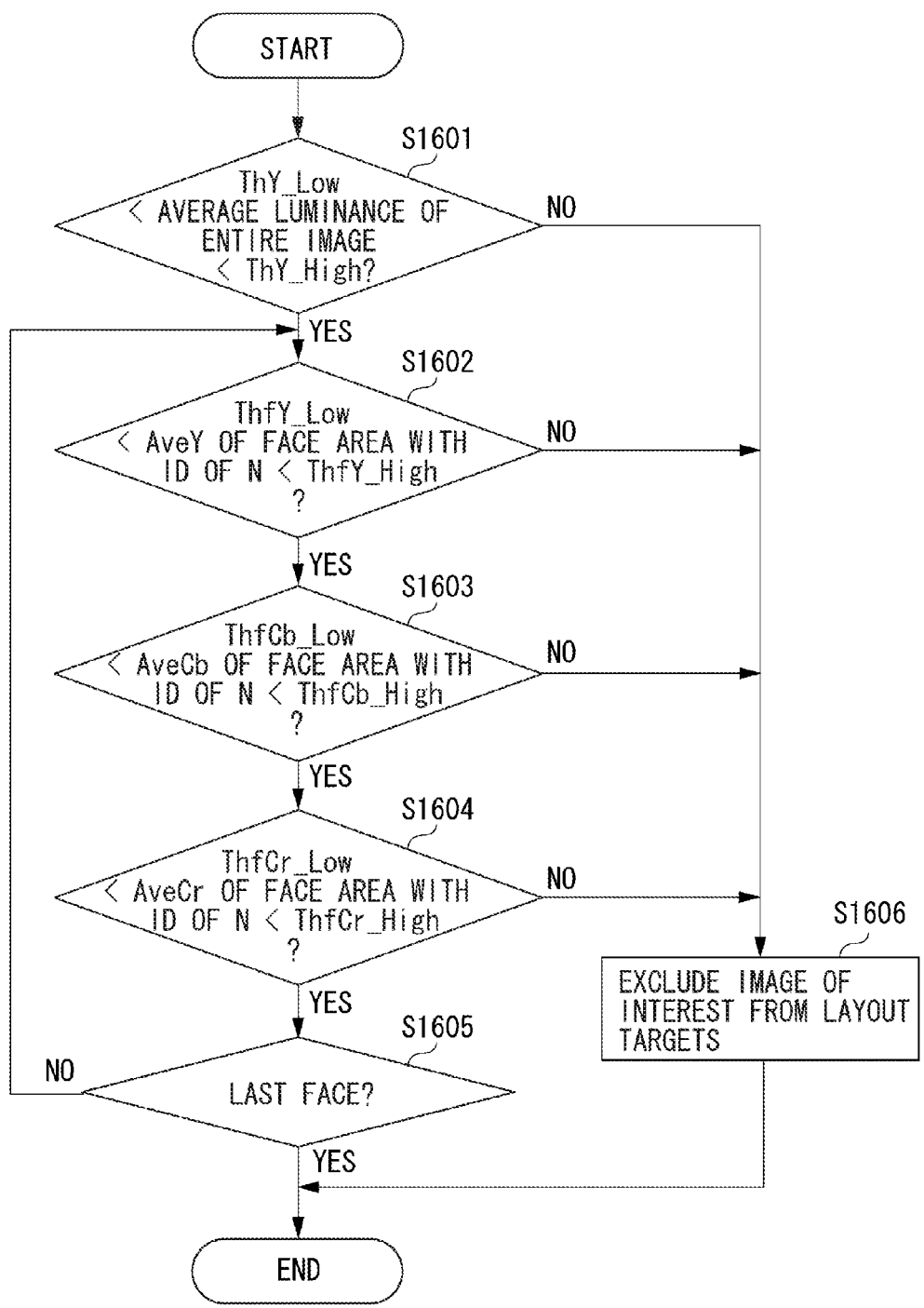
FIG. 16 is a flowchart of unnecessary image filtering processing according to the first exemplary embodiment.

Specifically, in step S1505, the layout generation unit 205 filters off unnecessary images in the input image groups by using the attribute information about the input image groups. The layout generation unit 205 performs the filtering processing on each image according to a flow of FIG. 16. In FIG. 16, in step S1601, the layout generation unit 205 initially determines whether an average luminance of the entire image is included in a range of certain thresholds (ThY_Low and ThY_High). If NO (NO in step S1601), the layout generation unit 205 proceeds to step S1606. In step S1606, the layout generation unit 205 excludes the image of interest from layout targets.

In steps S1602 to S1605, the layout generation unit 205 similarly determines whether an average luminance (AveY) and average color differences (AveCb and AveCr) of each face area included in the image of interest are included in ranges of predetermined thresholds that express favorable skin color areas. Only images that are determined to be YES in all of steps S1602 to S1605 are subjected to the subsequent layout generation processing. Specifically, in step S1602, the layout generation unit 205 determines whether AveY of a face area with an ID of N is included in a range of predetermined thresholds (ThfY_Low and ThfY_High). In step S1603, the layout generation unit 205 determines whether AveCb of the face area with the ID of N is included in a range of predetermined thresholds (ThfCb_Low and ThfCb_High). In step S1604, the layout generation unit 205 determines whether AveCr of the face area with the ID of N is included in a range of predetermined thresholds (ThfCr_Low and ThfCr_High). In step S1605, the layout generation unit 205 determines whether the face area is of the last face. If the face area is not of the last face (NO in step S1605), the layout generation unit 205 returns to step S1602. If the face area is of the last face (YES in step S1605), the layout generation unit 205 ends the filtering processing.

Note that this filtering processing is intended to exclude images that can be determined to be obviously unnecessary in the subsequent temporary layout generation processing. The thresholds are therefore desirably set to be relatively mild. For example, in the determination of the average luminance of the entire image in step S1601, fewer images are determined to be YES if the difference between ThY_High and ThY_Low is extremely small as compared to a dynamic range of the images. To avoid such situations, the filtering processing of the present exemplary embodiment sets the thresholds such that the difference is set as large as possible and images determined to be obviously abnormal can be excluded.

In step S1507 of FIG. 15, the layout generation unit 205 generates a large number (L) of temporary layouts by using image groups determined to be the layout targets by the foregoing filtering processing. The layout generation unit 205 generates the temporary layouts by repeating processing for arbitrarily applying input images to image layout frames of the acquired template. For example, the layout generation unit 205 determines the following parameters (image selection, arrangement, and trimming) at random.

Figure 17:
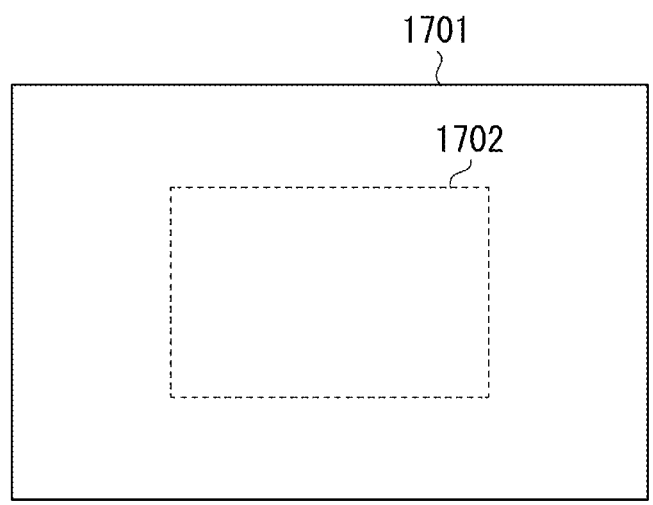
FIG. 17 illustrates an example of automatic trimming processing according to the first exemplary embodiment.

Examples of an image selection standard include which images to select from the image groups, given N image layout frames for layout. Examples of an arrangement standard include which image layout frames to arrange the selected plurality of images in. Examples of a trimming standard include a trimming ratio which indicates the degree of trimming processing to perform when arranging an image. For example, the trimming ratio is expressed as 0% to 100%. As illustrated in FIG. 17, the layout generation unit 205 trims an image at a predetermined trimming ratio with respect to the center of the image. In FIG. 17, an entire image 1701 is trimmed with a trimming frame 1702 at a trimming ratio of 50%.

Based on the foregoing image selection, arrangement, and trimming standards, the layout generation unit 205 generates temporary layouts as many as possible. Each of the generated temporary layouts can be expressed like an XML of FIG. 37. In each slot, an ID of the selected and arranged image is written with an ImageID tag, and the trimming ratio is written with a TrimmingRatio Tag.

The number L of temporary layouts to be generated here is determined according to the amount of processing of quantitative evaluations of the temporary layouts to be described below and the performance of the information processing apparatus 115 which performs the quantitative evaluations. For example, in the present exemplary embodiment, the layout generation unit 205 generated more than several hundreds of thousands of temporary layouts. The layout generation unit 205 may add IDs to the respective generated temporary layouts and store the resultant into the secondary storage device 102 as files in the XML format of FIG. 37. The layout generation unit 205 may store the generated temporary layouts into the RAM 102 by using other data structures.

In step S1508 of FIG. 15, the layout generation unit 205 performs quantitative evaluations of the large number of temporary layouts generated. Specifically, the layout generation unit 205 evaluates each of the L generated temporary layouts by using predetermined layout evaluation amounts. Table 3 lists the layout evaluation amounts according to the present exemplary embodiment. As shown in Table 3, the layout evaluation amounts used in the present exemplary embodiment are mostly classified into three categories.

TABLE 3

Examples of Layout Evaluation Values for Automatic Layout

| Category | Evaluation amount | Score range | Degree of importance (weight W) by theme | |
|---|---|---|---|---|
| | | | growth | travel ... |
| Image-specific evaluations | Brightness adequacy | 0 to 100 | 0.5 | 1.0 |
| | Saturation adequacy | 0 to 100 | 0.5 | 1.0 |
| Image and slot matching degree evaluations | Degree of person matching | 0 to 100 | 1.0 | 0.5 |
| | Over-trimming determination | 0 to 100 | 1.0 | 0.5 |
| In-page balance evaluations | Image similarity | 0 to 100 | 0.5 | 1.0 |
| | Color variations | 0 to 100 | 0.5 | 1.0 |
| | Face size variations | 0 to 100 | 0.5 | 1.0 |
| Others | User preference | 0 to 100 | 0.5 | 0.8 |

Figure 18:
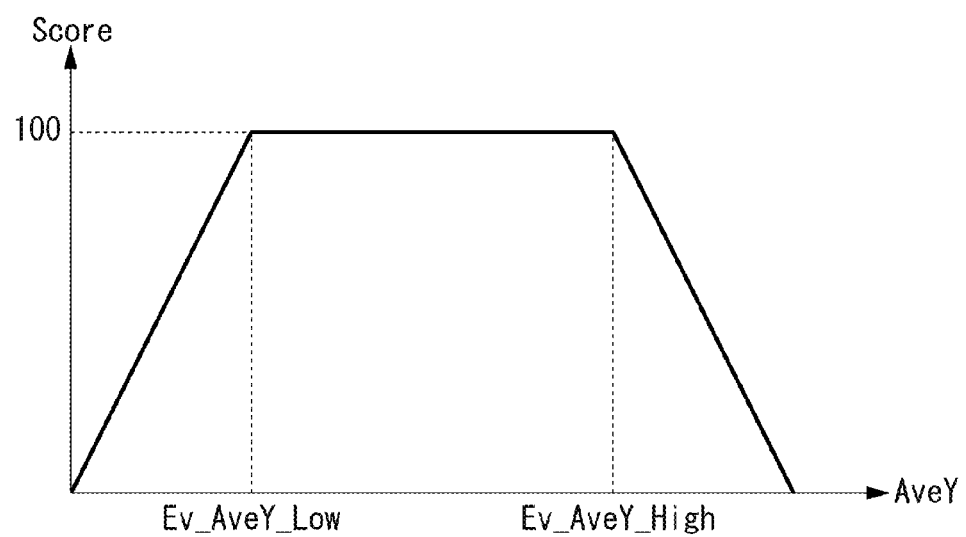
FIG. 18 illustrates a method for calculating a brightness adequacy according to the first exemplary embodiment.
Figure 19:
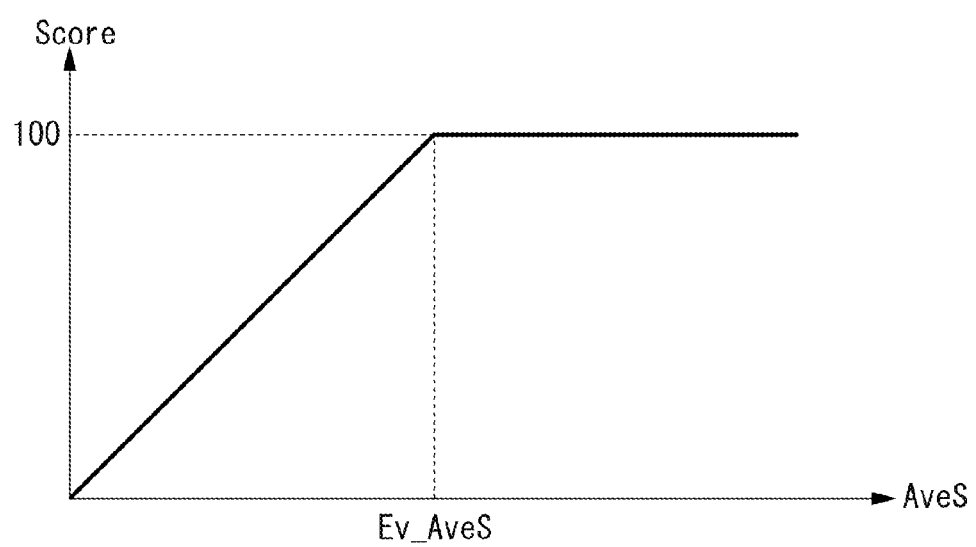
FIG. 19 illustrates a method for calculating a saturation adequacy according to the first exemplary embodiment.

The first category includes image-specific evaluation amounts. The image-specific evaluation amounts are intended to determine and indicate the brightness, saturation, and the state of shakes and blur of an image in scores. Examples of the scores according to the present exemplary embodiment are described below. As illustrated in FIG. 18, a brightness adequacy is set so that its score value is 100 when the average luminance of an entire image is in a certain range, and the score value decreases as the average luminance deviates from the range. As illustrated in FIG. 19, a saturation adequacy is set so that its score value is 100 if the average saturation of the entire image is higher than a certain saturation value, and the score value decreases gradually as the average saturation becomes lower than the predetermined value.

Figure 20:
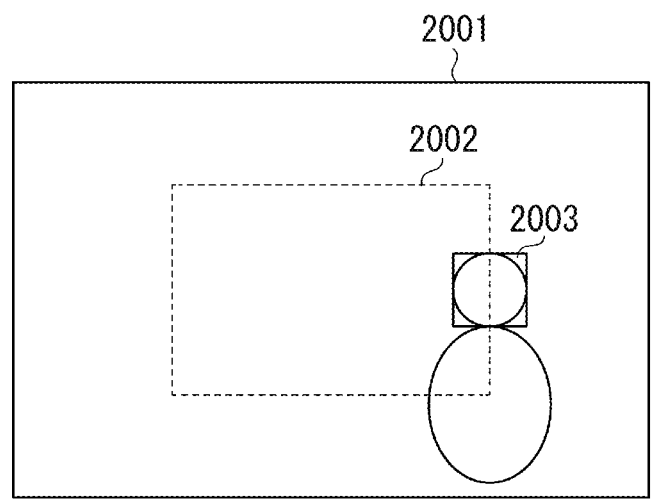
FIG. 20 illustrates over-trimming determination processing according to the first exemplary embodiment.

The second category includes evaluations about the degrees of matching of an image and a slot. Examples of the evaluations about the degrees of matching of an image and a slot include a degree of person matching and an over-trimming determination. The degree of person matching indicates a matching rate between a person or persons specified for a slot and a person or persons in the image actually arranged in the slot. For example, suppose that a slot is a person group specified by an XML, and "father" and "son" are designated for the slot. If an image assigned to the slot includes the two persons, the degree of person matching of the slot has a score value of 100. If the image includes either one of the persons, the degree of matching has a score value of 50. If the image includes neither of the persons, the score value is zero. For a degree of matching within a page, the layout generation unit 205 determines an average of the degrees of matching calculated for respective slots. For an over-trimming determination of a trimming area 1702, the layout generation unit 205 calculates a score value in the range of 0 to 100. For example, as illustrated in FIG. 20, if a position 2003 of a face in an image is known, the layout generation unit 205 calculates the score value according to the area of the trimmed portion. If the face area is not trimmed, the score is 100. On the other hand, if the entire face area is trimmed, the score value is zero.

The third category includes evaluations of balance within a layout page. Examples of evaluation values for evaluating balance include a degree of image similarity, color variations, and face size variations. The degree of image similarity refers to the degree of similarity of images within a layout page. The layout generation unit 205 calculates the degree of image similarity with respect to each of the large number of temporary layouts generated. For example, when generating a layout on a travel theme, it may not be a good layout to include only too similar images having high degrees of similarity. For example, the layout generation unit 205 can evaluate degrees of similarity based on the photographing date and time. Images having similar photographing dates and times are likely to have been captured in similar locations. Images having different photographing dates and times are likely to have been captured in different locations and on different scenes accordingly. As illustrated in FIG. 32A, the layout generation unit 205 can acquire photographing dates and times from the attribute information about the images, stored as image attribute information in the database unit 202 in advance. The layout generation unit 205 performs the following calculation to determine the degree of similarity from the photographing dates and time. For example, suppose that four images listed in Table 4 are laid out on a temporary layout of interest.

The images are identified by image IDs. Photographing date and time information has been attached to each image. Specifically, the attached photographing date and time information includes a year, month, date, and time (year: YYYY, month: MM, date: DD, hour: HH, minute: MM, and second: SS). The layout generation unit 205 calculates a minimum photographing time interval among the four images.

TABLE 4

| Image ID | Photographing date and time (YYYYMMDD:HHMMSS) |
|---|---|
| 25 | 20100101:120000 |
| 86 | 20100101:150000 |
| 102 | 20100101:170000 |
| 108 | 20110101:173000 |

Here, the minimum interval is 30 minutes between the images having the image IDs of 102 and 108. The layout generation unit 205 stores this interval as MinInterval in units of seconds. Specifically, the minimum interval of 30 minutes is 1800 seconds. The layout generation unit 205 calculates MinInterval with respect to each of the L temporary layouts, and stores the MinInterval into an array stMinInterval[l]. The layout generation unit 205 determines a maximum value MaxMinInterval in stMinInterval[l]. The layout generation unit 205 then can determine an evaluation value of the degree of similarity of an l-th temporary layout, Similarity[l], by the following equation:

$$\text{Similarity}[l] = 100 \times \text{stMinInterval}[l] / \text{MaxMinInterval} \qquad \text{Eq. 2}$$

The value of Similarity[l] approaches 100 as the minimum photographing time interval increases. The value of Similarity[l] approaches 0 as the minimum photographing time interval decreases. Similarity[l] is thus useful as an image similarity degree evaluation value.

Next, color variations will be described. For example, when generating a layout on a travel theme, it may not be a good layout to include only images of too similar colors (for example, blue of the blue sky or green of mountains). In such a case, layouts having greater color variations are highly evaluated. The layout generation unit 205 calculates a variance of the average hues AveH of images included in an l-th temporary layout of interest, and stores the variance as a degree of color variations tmpColorVariance[l]. The layout generation unit 205 determines a maximum value MaxColorVariance in tmpColorVariance[l]. The layout generation unit 205 then can determine an evaluation value of the degree of color variations of an l-th temporary layout, ColorVariance[l], by the following equation:

$$ColorVariance[l] = 100 \times tmpColorVariance[l]/MaxColorVariance \quad \text{Eq. 3}$$

The value of ColorVariance[l] approaches 100 as variations of the averages hues of the images arranged in a page increase. The value of ColorVariance[l] approaches 0 as the variations decrease. ColorVariance[l] can thus be used as an evaluation value of the degree of color variations.

Next, face size variations will be described. For example, when generating a layout on a travel theme, it may not be a good layout to include only images of too similar face sizes. A good layout is considered to include large faces and small faces arranged in a favorable balance on a layout page. In such a case, layouts having large face size variations are highly evaluated. The layout generation unit 205 stores a variance value of the sizes of faces arranged on an l-th temporary layout of interest as tmpFaceVariance[l]. The size of a face refers to the diagonal distance from a top left to a bottom right of the face position. The layout generation unit 205 determines a maximum value MaxFaceVariance in tmpFaceVariance[l]. The layout generation unit 205 then can determine an evaluation value of the degree of face size variations of an l-th temporary layout, FaceVariance[l], by the following equation:

$$FaceVariance[l] = 100 \times tmpFaceVariance[l]/MaxFaceVariance \quad \text{Eq. 4}$$

The value of FaceVariance[l] approaches 100 as variations of the sizes of the faces arranged on a sheet increase. The value of FaceVariance[l] approaches 0 as the variations decrease. FaceVariance[l] can thus be used as an evaluation value of the degree of face size variations.

The others category may include the user's preference evaluations.

The foregoing plurality of evaluation values calculated for each temporary layout will be referred to integrally as layout evaluation values of each temporary layout. A comprehensive evaluation value of an l-th temporary layout will be denoted by EvalLayout[l]. The N evaluation values calculated above (including the evaluations values of Table 3) will be denoted by EvalValue[n]. The layout generation unit 205 can determine the comprehensive evaluation value by the following equation:

$$EvalLayout[l] = \sum_{n=0}^{N} EvalValue[n] \times W[n] \quad \text{Eq. 5}$$

In the foregoing equation, W[n] is the weight of each evaluation value on each scene, listed in Table 3. Different weights are set for different layout themes. For example, compare the themes of a growth record "growth" and a trip "travel" listed in Table 3. On a travel theme, it is often desirable to lay out a large number of pictures having as high a quality as possible on various scenes. The weights are therefore set to place emphasis on the image-specific evaluation values and the in-pace balance evaluation values. In contact, for a growth record "growth", whether the main character of the growth record matches the slots without fail is often more important than image variations. The weights are thus set to place emphasis on the image and slot matching degree evaluations over the in-page balance and image-specific evaluations. In the present exemplary embodiment, the degrees of importance by theme are set as listed in Table 3.

In step S1509, by using EvalLayout[l] thus calculated, the layout generation unit 205 generates a layout list LayoutList[k] for displaying layout results. The layout list LayoutList[k] stores the identifiers l of a predetermined number (for example, five) of EvalLayout[l] having the highest evaluation values. For example, if the 50th temporary layout (l=50) scores the highest, LayoutList[0]=50. The layout generation unit 205 similarly stores the identifiers l of the temporary layouts having the second highest and subsequent score values into LayoutList[1] and later.

Figure 21:
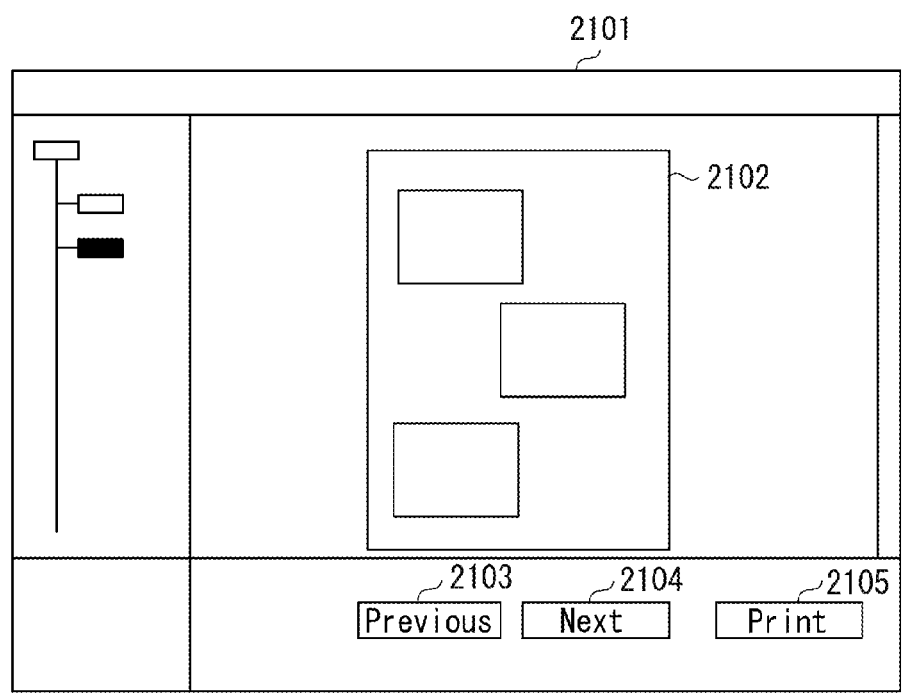
FIG. 21 illustrates a display example of a result of automatic layout generation according to the first exemplary embodiment.

Referring back to FIG. 6, in step S605, the rendering unit 206 renders a layout result obtained by the foregoing automatic layout generation processing, and displays the rendering result as illustrated in FIG. 21. In step S605, the rendering unit 206 initially reads the identifier l stored in LayoutList[0], and reads the temporary layout corresponding to the identifier l from the secondary storage device 103 or the RAM 102. As described above, the temporary layout includes template information and image IDs assigned to respective slots included in the template. Based on such information, the rendering unit 206 renders the temporary layout by using drawing functions of the operating system (OS) running on the information processing apparatus 115, and displays a layout result 2102 as illustrated in FIG. 21.

In FIG. 21, the user presses a next button 2104 to read the identifier l of LayoutList[1] having the second score. The rendering unit 206 performs rendering as described above, and displays the resultant. The user can thus view different variations of suggested layouts. The user can press a previous button 2103 to redisplay the previously displayed layout. If the user likes the displayed layout, the user can press a print button 2105 to print out the layout result 2102 from the printer 112 connected to the information processing apparatus 115.

Now, processing for updating the face dictionary used in individual recognition according to the present exemplary embodiment will be described in detail. As employed herein, a face dictionary refers to face recognition information used for individual recognition.

As illustrated in FIG. 12, person groups displayed on a UI may include misrecognition. For example, father who is supposed to be the same person may be determined to be different persons, and a predetermined face area may be assigned to an incorrect person group by the person group generation processing. The user's correction operation in such a case will be described with reference to FIG. 12. More specifically, the user's correction operation will be described by using a case where a face image of a person son different from father is misrecognized and displayed in a person group of father as an example. In such a case, the user operates a mouse pointer 1207 to drag an incorrect face image 1204 to a correct person group of son. The face image 1204 is thereby grouped into the correct person group on the UI. In other words, the face image 1204 is grouped into the correct person group by a correction instruction from the user. Such a user operation is equivalent to changing the person name of the person group of the face image 1204 from father to son.

The user operation explicitly indicates that the third face image 1204 from the left is not a face image of father but son. This user operation indicates both incorrect person information and correct person information. In the present exemplary embodiment, such operation information is reflected on the face dictionary to improve the subsequent recognition accuracy.

In the present exemplary embodiment, the face dictionary is corrected, or equivalently, updated based on such a user operation.

FIGS. 23A and 23B are diagrams illustrating an internal configuration of the face dictionary. In FIGS. 23A and 23B, the face dictionary contains face feature amounts 2304, which are classified in units of face feature amounts 2304 having predetermined or higher degrees of similarity and stored as face feature amount groups 2303. A dictionary ID 2301 and a person ID 2302 are attached to each face feature amount group 2303. The dictionary ID 2301 identifies a face feature amount group 2303 in the face dictionary. The person ID 2302 identifies the person having the face feature amounts 2304.

In the present exemplary embodiment, the third face image 1204 from the left on the UI illustrated in FIG. 12 corresponds to the third face feature amount 2304 from the left, registered with a dictionary ID of 1 in the face dictionary illustrated in FIG. 23A. According to the user's moving operation, the information processing apparatus 115 moves the third face feature amount 2304 from the left registered in the face feature amount group 2303 identified by the dictionary ID of 1 which is associated with father in FIG. 23A to the face feature amount group 2303 of son as illustrated in FIG. 23B. In other words, the information processing apparatus 115 removes the face feature amount 2304 corresponding to the face to be corrected from the face feature amount group 2303 associated with the person ID of father, and registers a face feature amount 2401 corresponding to the face to be corrected into the face feature amount group 2303 associated with the person ID of son.

By the method described above, the information processing apparatus 115 updates the contents of the face dictionary to increase the probability that an input face image of son similar to the face feature amount 2401 is correctly determined to be of son instead of father in subsequent recognition processing. In other words, the information processing apparatus 115 can improve the accuracy of individual recognition. This can save the user from subsequently performing correction operations. More specifically, the user's single correction operation can improve the accuracy of individual recognition in the subsequent individual recognition processing.

The layout generation unit 205 can perform the subsequent automatic layout generation processing by using the face recognition information whose accuracy has been improved by the foregoing method to improve the accuracy of automatically generated layouts.

A second exemplary embodiment is similar to the first exemplary embodiment except the processing for updating the face dictionary. A redundant description will be omitted.

The second exemplary embodiment will be described with reference to FIG. 24. FIG. 24 is a diagram illustrating an internal configuration of a face dictionary. In FIG. 24, the face dictionary contains face feature amounts which are classified in units of face feature amounts having predetermined or higher degrees of similarity and stored as face feature amount groups 2504. A dictionary ID 2501 and a person ID 2502 are attached to each face feature amount group 2504. As illustrated in FIG. 24 in advance, the following description deals with a case where a person ID of father manages two dictionary IDs of 1 and 2.

In person recognition processing, the same person may be recognized as different persons because of different face feature amounts. Examples of the case where the same person has different face feature amounts include when the person wears an angry face and a smiling face. With an angry face and a smiling face, organs such as the eyes and mouth have different feature amounts. The same person with different feature amounts is associated with respective different dictionary IDs and displayed as different persons on a UI.

For example, suppose that No name1 in FIG. 7 is father who is smiling and No name2 is father who is angry. In such a case, the user makes operations to name both person groups father. Consequently, No name1 and No name2 are managed by the single person ID of father, and thus displayed as the same group on the UI. In the present exemplary embodiment, when the user corrects person IDs, the information processing apparatus 115 corrects only the person IDs of the face dictionary and continues separately managing the dictionary IDs. Since the dictionary IDs are separately managed in the face dictionary without being managed by the person IDs, the accuracy of similarity degree determination can be maintained. Note that if face feature amounts originally classified as those of different persons in the face dictionary are combined into those of one person and the resulting face dictionary is used to perform similarity degree determination, misrecognition tends to occur due to the increased acceptability of similarity.

FIG. 24 illustrates the configuration of the face dictionary where one person ID (=father) displayed on the UI is linked with a plurality of dictionary IDs. FIG. 24 illustrates a case where the face feature amount group 2504 of son, linked with a dictionary ID of 3, includes a face feature amount 2503 that is actually a face feature amount of father. In other words, the face feature amount 2503 of father is misrecognized as that of son.

In the present exemplary embodiment, the second face image from the left on a not-illustrated UI corresponds to the second face feature amount 2503 from the left, registered with the dictionary ID of 3 in the face dictionary illustrated in FIG. 24. Here, the user can make an operation to drag and drop the image registered in the incorrect person group on the UI display to the correct person group of father by using a mouse pointer, thereby changing the person ID from son to father.

Figure 25:
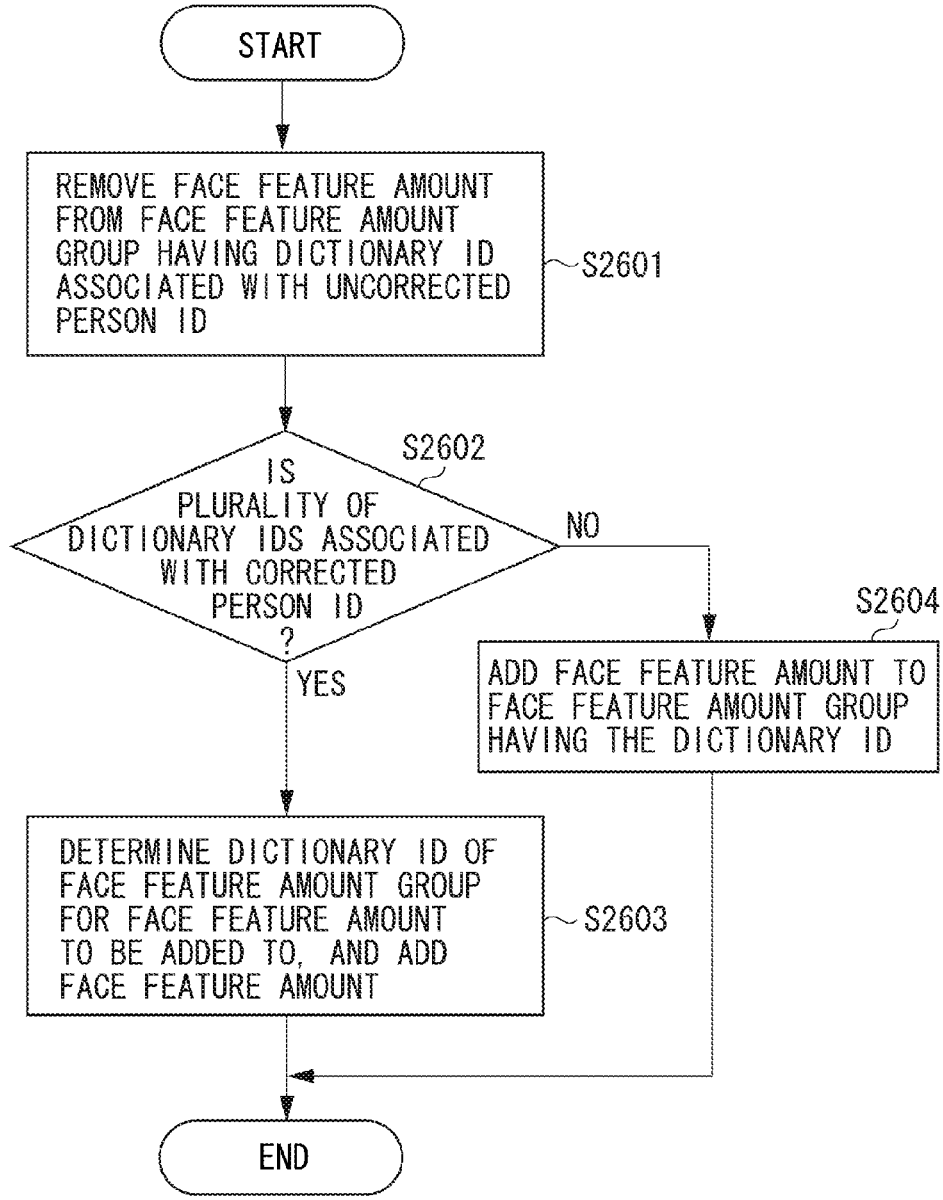
FIG. 25 is a flowchart of face dictionary update processing according to the second exemplary embodiment.

The processing for updating the face feature amounts of the face dictionary here will be described with reference to the flowchart of FIG. 25.

In step S2601, the information processing apparatus 115 removes the face feature amount 2503 corresponding to the face to be corrected from the face feature amount group 2504 having the dictionary ID associated with the uncorrected person ID.

In step S2602, the information processing apparatus 115 determines whether a plurality of dictionary IDs is associated with the corrected person ID. If a plurality of dictionary IDs is associated (YES in step S2602), the information processing apparatus 115 proceeds to step S2603. If only one dictionary ID is associated (NO in step S2602), the information processing apparatus 115 proceeds to step S2604.

In step S2604, the information processing apparatus 115 adds the face feature amount 2503 corresponding to the face to be corrected to the face feature amount group 2504 having the dictionary ID.

In step S2603, the information processing apparatus 115 determines the dictionary ID of the face feature amount group 2504 for the face feature amount 2503 to be added to. The information processing apparatus 115 initially compares the face feature amount 2503 corresponding to the face to be corrected with face feature amounts included in each of the two or more face feature amount groups 2504 having the dictionary IDs associated with the corrected person ID. The information processing apparatus 115 compares the face feature amounts by comparing the degrees of similarity of the face feature amounts. For example, a face feature amount includes information about face's feature positions such as eyes, a nose, a mouth, and an outline. The information processing apparatus 115 can compare the information about the feature positions to calculate the degrees of similarity. The information processing apparatus 115 then adds the face feature amount 2503 to the face feature amount group 2504 having a dictionary ID at which an average degree of similarity is high.

The information processing apparatus 115 thereby ends updating the contents of the face dictionary.

In the present exemplary embodiment, the information processing apparatus 115 calculates the degrees of similarity between the face feature amount 2503 and the face feature amounts included in the face feature amount groups 2504 having the dictionary IDs of 1 and 2. The information processing apparatus 115 calculates an average degree of similarity for each dictionary ID, and adds the face feature amount 2503 to the face feature amount group 2504 having the dictionary ID at which the average degree of similarity is higher.

In the present exemplary embodiment, like the first exemplary embodiment, the information processing apparatus 115 updates the face dictionary in response to a user operation. The information processing apparatus 115 can thereby improve the accuracy of individual recognition in the subsequent recognition processing using the face dictionary. This can save the user from subsequently performing correction operations. More specifically, the user's single correction operation can improve the accuracy of individual recognition in the subsequent individual recognition processing.

The layout generation unit 205 can perform the subsequent automatic layout generation processing by using the face recognition information whose accuracy has been improved by the foregoing method to improve the accuracy of automatically generated layouts.

As described above, the individual recognition processing has the problem that if the face feature amounts for determining the same person include ones having low degrees of similarly, misrecognition tends to occur because of an increased acceptability of recognition determination. In contrast, in the present exemplary embodiment, one person ID may be associated with dictionary IDs of face feature amount groups including different face feature amounts, whereby the accuracy of similarity degree determination can be improved.

This can prevent the face feature amount groups of respective dictionary IDs from including face feature amounts having low degrees of similarity, thereby avoiding a drop in the accuracy of subsequent recognition.

A third exemplary embodiment is similar to the first exemplary embodiment except the processing for updating the face dictionary. A redundant description will be omitted. The third exemplary embodiment deals with a case where the face dictionary illustrated in FIGS. 23A and 23B is configured to limit the number of face feature amounts that can be registered in the face feature amount group of each dictionary ID.

In the present exemplary embodiment, there is a limit to the number of face feature amounts that can be registered in a face feature amount group specified by a dictionary ID. This can suppress a drop in the recognition accuracy because a lot of face feature amounts of different facial expressions, or equivalently, a lot of face feature amounts with far different degrees of similarity are included. The reason for the drop in the recognition accuracy is that the inclusion of a lot of different face feature amounts tends to widen the acceptability of determination of the same person.

In view of the foregoing, an upper limit value is desirably set to the number of face feature amounts for determining the same person. In the present exemplary embodiment, an upper limit value Nh is set to the number of face feature amounts for determining the same person.

A method for updating a face dictionary according to the present exemplary embodiment will be described with reference to FIG. 26. FIG. 26 illustrates a configuration of a face dictionary where an upper limit value Nh=5 is set as the upper limit of the number of face feature amounts. That is, in the present exemplary embodiment, the upper limit of the number of face feature amounts that can be registered in the face feature amount group of each dictionary ID is five.

Suppose that a face feature amount 2703 included in a face feature amount group 2704 having a dictionary ID of 3 and a person ID of son is actually a face feature amount of father.

Like the first exemplary embodiment, the user makes a UI operation to correct the face image of father displayed in the person group of son to the correct person group of father.

The processing for updating the face dictionary here will be described with reference to the flowchart of FIG. 27.

In step S2801 of FIG. 27, the information processing apparatus 115 removes the face feature amount of the face to be corrected from the face feature amount group having the dictionary ID as in step S2601 of the second exemplary embodiment.

In step S2802, the information processing apparatus 115 initialize a value of a variable N for specifying a value of the dictionary ID.

In step S2803, the information processing apparatus 115 determines a dictionary ID at which the average degree of similarity to the face feature amount 2703 is the n-th highest among dictionary IDs that are associated with the corrected person ID (in the case of the present exemplary embodiment, father). Suppose that the dictionary ID at which the average degree of similarity is the highest is 1.

In step S2804, the information processing apparatus 115 determines whether the average degree of similarity at the dictionary ID is higher than or equal to a predetermined threshold Sth. If the average degree of similarity is higher than or equal to the predetermined threshold Sth (YES in step S2804), the information processing apparatus 115 proceeds to step S2805. If the average degree of similarity is lower than the predetermined threshold Sth (NO in step S2804), then in step S2808, the information processing apparatus 115 issues a new dictionary ID.

In step S2808, the information processing apparatus 115 generates a new dictionary ID in order to prevent face feature amounts having lower degrees of similarity from being included in the face feature amount group of the same dictionary ID. In step S2809, the information processing apparatus 115 adds the face feature amount 2703 to a face feature amount group having the issued new dictionary ID. FIG. 28A illustrates an internal configuration of such a face dictionary. In FIG. 28A, since the face feature amount 2703 is known to be of father from the user operation, the information processing apparatus 115 links a new dictionary ID of 4 with the person ID=father, and stores a face feature amount 2904.

In step S2805, the information processing apparatus 115 determines whether there is a free space in the face feature amount group having the dictionary ID. If there is a free space in the face feature amount group 2704 having the dictionary ID (YES in step S2805), the information processing apparatus 115 proceeds to step S2809. In step S2809, the information processing apparatus 115 adds the face feature amount 2703 to the face feature amount group 2704 having the dictionary ID. On the other hand, if there is no free space in the face feature amount group 2704 having the dictionary ID (NO in step S2805), the information processing apparatus 115 proceeds to step S2806. In the present exemplary embodiment, the dictionary ID at which the average degree of similarity is the highest is 1. According to FIG. 26, the face feature amount group 2704 having the dictionary ID of 1 already includes five face feature amounts. The determination in step S2805 is thus NO.

In step S2806, the information processing apparatus 115 determines whether the variable N is a maximum value. Specifically, the information processing apparatus 115 determines whether the variable N is the total number of dictionary IDs linked with the person ID. If the variable N is the maximum value (YES in step S2806), the information processing apparatus 115 proceeds to step S2808. If the variable N is not the maximum value (NO in step S2806), the information processing apparatus 115 proceeds to step S2807. In the case of the present exemplary embodiment, the information processing apparatus 115 determines whether the variable N is the total number Nmax of dictionary IDs linked with father, i.e., two. Since N=1, the determination in step S2806 is NO. In step S2807, the information processing apparatus 115 increments the variable N.

In step S2809, the information processing apparatus 115 adds the face feature amount 2703 to the face feature amount group 2704 having the dictionary ID, and ends the processing.

The case where N=2 will be briefly described. In step S2803, the information processing apparatus 115 determines the dictionary ID at which the average degree of similarity is the N-th highest, i.e., the second highest. Suppose that the dictionary ID is 2. The information processing apparatus 115 calculates the average degree of similarity of the face feature amounts included in the face feature amount group 2704 having the dictionary ID of 2. In step S2804, the information processing apparatus 115 compares the average degree of similarity with the threshold Sth. If the average degree of similarity is higher than or equal to the threshold Sth (YES in step S2804), then in step S2805, the information processing apparatus 115 determines whether there is a free space. In FIG. 28B, four face feature amounts are registered in the face feature amount group 3004 having the dictionary ID of 2. The information processing apparatus 115 thus determines that there is a free space. In step S2809, the information processing apparatus 115 adds a face feature amount 3003 to the face feature amount group 3004 having the dictionary ID of 2.

As described above, in the present exemplary embodiment, the information processing apparatus 115 updates the corrected face dictionary by determining the average degree of similarity and the presence or absence of a free space in the face feature amount group of each dictionary ID. If there is no free space or if the average degree of similarity is lower than the predetermined threshold, the information processing apparatus 115 issues a new dictionary ID and links the issued new dictionary ID with the corrected person ID. This suppresses a drop in the recognition accuracy due to an increased acceptability of the degree of similarity. The accuracy of the subsequence recognition processing can also be improved as in the first exemplary embodiment.

A fourth exemplary embodiment is similar to the third exemplary embodiment except the processing for updating the face dictionary. A redundant description will be omitted.

Figure 29:
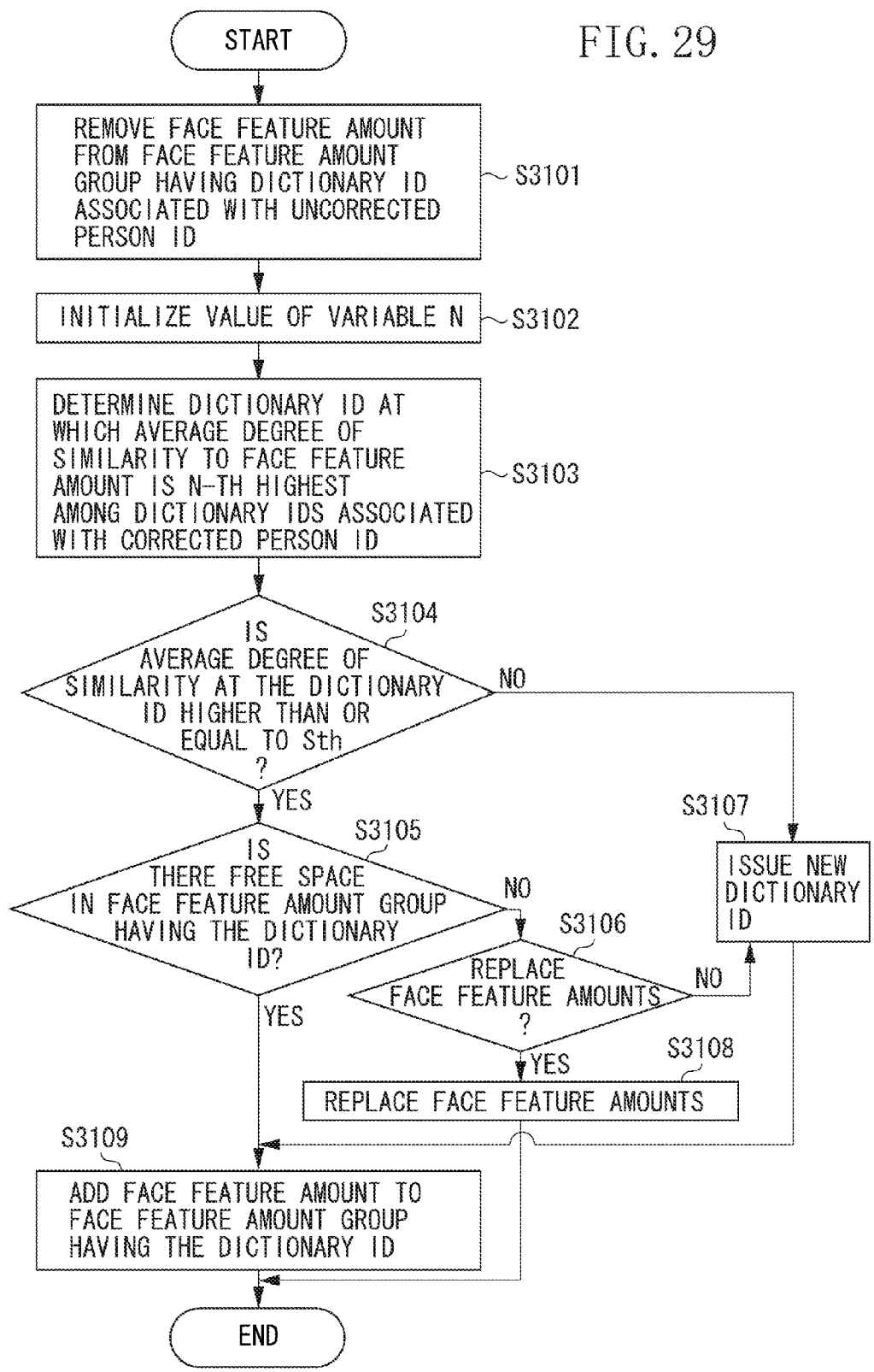
FIG. 29 is a flowchart of face dictionary update processing according to a fourth exemplary embodiment.

The updating of the face dictionary according to the fourth exemplary embodiment will be described with reference to the flowchart of FIG. 29. Steps S3101 to S3104 in the flowchart of FIG. 29 are similar to steps S2801 to S2804 of the third exemplary embodiment. A description thereof will thus be omitted.

In step S3105, the information processing apparatus 115 determines whether there is a free space in the face feature amount group having the dictionary ID. If there is a free space (YES in step S3105), the information processing apparatus 115 proceeds to step S3109. If there is no free space (NO in step S3105), the information processing apparatus 115 proceeds to step S3106.

In step S3106, the information processing apparatus 115 determines whether to replace face feature amounts. In other words, the information processing apparatus 115 determines whether there is a face feature amount to be replaced with. If there is determined to be a face feature amount to be replaced with the face feature amount to be corrected (YES in step S3106), the information processing apparatus 115 proceeds to step S3108. If there is determined to be no face feature amount to be replaced with (NO in step S3106), the information processing apparatus 115 proceeds to step S3107.

Processing for determining whether to replace face feature amounts will be described. In the dictionary configuration of FIG. 26, suppose that the dictionary ID at which the average degree of similarity to the face feature amount 2703 to be corrected is the highest is 1. This average degree of similarity is denoted by S0. In FIG. 26, there is no free space in the face feature amount group 2704 having the dictionary ID of 1. The information processing apparatus 115 then compares the five face feature amounts registered in advance with the face feature amount 2703 to be corrected to determine whether there is a face feature amount to be replaced with the feature amount 2703.

Specifically, suppose that the five face feature amounts included in the face feature amount group 2704 having the dictionary ID of 1, which is assumed to have the highest average degree of similarity to the face feature amount 2703 to be corrected, are F1, F2, F3, F4, and F5, respectively.

The information processing apparatus 115 compares each of the face feature amounts F1, F2, F3, F4, and F5 with the others to calculate an average degree of similarity. Specifically, the information processing apparatus 115 initially calculates the degrees of similarity of the face feature amount F to the face feature amounts F2 to F5, and determines an average of the degrees of similarity, or an average degree of similarity S1. The method for calculating the degrees of similarity is not limited in particular. For example, a known method may be used. In the present exemplary embodiment, the information processing apparatus 115 calculates differences of position information about organs such as eyes, a nose, and a mouth, stored as the face feature amounts. The smaller the total of such differences, the higher the degree of similarity. The information processing apparatus 115 similarly compares the face feature amount F2 with the other four face feature amounts in terms of the degree of similarity, and calculates an average degree of similarity S2. In such a manner, the information processing apparatus 115 calculates average degrees of similarities S1 to S5.

Next, the information processing apparatus 115 determines the lowest degree of similarity among the average degrees of similarity S1 to S5, and compares the lowest degree of similarity with the degree of similarity S0 of the forgoing face feature amount 2703 to the face feature amount group 2704 having the dictionary ID of 1. If the lowest degree of similarity is lower than the degree of similarity S0, the information processing apparatus 115 determines that there is a face feature amount to be replaced with. For example, if the lowest degree of similarity is S4, the information processing apparatus 115 compares the lowest degree of similarity S4 with the degree of similarity S0 of the foregoing face feature amount 2703 to the face feature amount group 2704 having the dictionary ID of 1. If S4<S0, the information processing apparatus 115 determines to replace the face feature amount F4 with the face feature amount 2703.

In step S3108, the information processing apparatus 115 replaces the face feature amounts. For example, in the foregoing case, the information processing apparatus 115 replaces the face feature amount F4 with the face feature amount 2703. FIG. 30 illustrates the resulting dictionary configuration. The face feature amount 3203 of FIG. 30 is the same as the face feature amount 2703 of FIG. 26.

In the present exemplary embodiment, the face feature amount group of each dictionary ID is configured to include face feature amounts that make the average degree of similarity as high as possible. This can reduce the acceptability of similarity to increase the subsequent recognition accuracy.

The present exemplary embodiment has dealt with a method for determining a face feature amount having the lowest degree of similarity to be an update candidate, i.e., a dictionary item to be replaced. However, an exemplary embodiment of the present invention is not limited thereto. Similar effects can be obtained by any update method that includes determining a dictionary ID at which a degree of similarity is high, and comparing face feature amounts included in the face feature amount group having the dictionary ID with the face feature amount to be corrected.

A fifth exemplary embodiment is similar to the third exemplary embodiment except the processing for updating the face dictionary. A redundant description will be omitted.

The first to fourth exemplary embodiments each have dealt with updating the face dictionary where the person ID of the face to be corrected is corrected. The fifth exemplary embodiment deals with a method for determining a degree of similarity based on uncorrected information.

The method for determining a degree of similarity according to the present exemplary embodiment will be described with reference to FIGS. 31A and 31B. FIGS. 31A and 31B are diagrams illustrating a dictionary configuration according to the present exemplary embodiment. In FIG. 31A, suppose that a face feature amount 3301 included in the face feature amount group having a dictionary ID of 1 and a person ID=father is actually a face feature amount of son. In other words, the face feature amount 3301 of son is misrecognized as that of father.

In the present exemplary embodiment, a similarity degree threshold 3302 for use in determining the same person is set for each dictionary ID. Similarity degree thresholds 3302 of different values may be set, whereas ones of the same value "80" are set in an initial state in FIG. 31A.

Suppose, in the present exemplary embodiment, that the third face image from the left on a not-illustrated UI corresponds to the third face feature amount 3301 from the left, registered with the dictionary ID of 1 in the face dictionary illustrated in FIG. 31A. Here, the user makes an operation to drag and drop the image registered in the incorrect group to the correct person group of son on the UI display by using a mouse pointer, thereby changing the person ID from father to son.

In the present exemplary embodiment, in response to the user's operation, the information processing apparatus 115 changes the similarity degree threshold at the dictionary ID of 1 where there has been the misrecognition. Specifically, as illustrated in FIG. 31B, the information processing apparatus 115 increases the similarity degree threshold 3402 at the dictionary ID of 1 where there has been the misrecognition by a predetermined amount from the initial state, thereby setting the similarity degree determination severer. The reason is that if there has been misrecognition, the face feature amounts managed by the dictionary ID of 1 have been a face feature amount group that tends to cause misrecognition for some reason. Among examples of the reason why a face feature amount group tends to cause misrecognition is that face feature amounts of different facial expressions are included.

In response to the user's operation, the information processing apparatus 115 updates the face dictionary and re-sets similarity degree determination severer. This can reduce the probability of misrecognition recurring at the dictionary ID of 1 when a new face feature amount is input next time. As a result, the accuracy of individual recognition can be improved.

In the present exemplary embodiment, the similarity degree threshold is increased from 80 to 85. An exemplary embodiment of the present invention is not limited thereto, and other values and other increments may be used.

Figure 38:
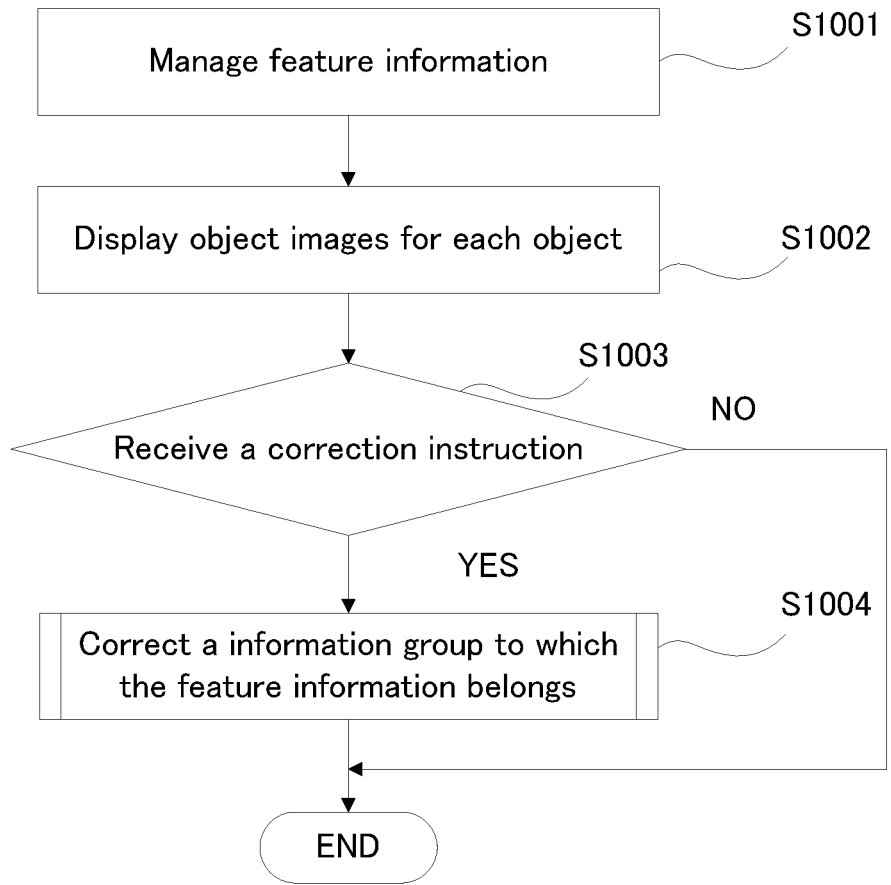
FIG. 38 is a flow chart of a processing flow according to an exemplary embodiment.

FIG. 38 illustrates a processing flow according to an exemplary embodiment of the present application. Referring to FIG. 38, the processing steps will be described below.

In step S1001, feature information is managed in a face dictionary. Referring to FIGS. 23A and 23B, according to an exemplary embodiment, diagrams illustrating an internal configuration of a face dictionary are shown. As described above in , in FIGS. 23A and 23B, the face dictionary contains face feature amounts 2304, which are classified in units of face feature amounts 2304 having predetermined or higher degrees of similarity and stored as face feature amount groups 2303. In some embodiments, a dictionary ID 2301 and a person ID 2302 are attached to each face feature amount group 2303. The dictionary ID 2301 identifies a face feature amount group 2303 in the face dictionary. The person ID 2302 identifies the person having the face feature amounts 2304.

In step S1002, object images for each object are displayed in connection with a process for receiving correction instructions. As discussed above regarding FIG. 12, person groups displayed on a UI may include misrecognition. For example, father who is supposed to be the same person may be determined to be different persons, and a predetermined face area may be assigned to an incorrect person group by the person group generation processing. A process for obtaining a user's correction operation is provided for such situations. The user's correction operation in such a case is illustrated in FIG. 12, and is described with reference to FIG. 12 above. As discussed above, a case where a face image of a person son different from father is misrecognized and displayed in a person group of father as an example, is described. In such a case, as described above, the user operates a mouse pointer 1207 to drag an incorrect face image 1204 to a correct person group of son. The face image 1204 is grouped into the correct person group on the UI. In other words, the face image 1204 is grouped into the correct person group by a correction instruction from the user. Such a user operation is equivalent to changing the person name of the person group of the face image 1204 from father to son.

In step S1003, it is determined whether a correction instruction is received from a user. As discussed above with regard to FIG. 12, according to an exemplary embodiment, a face dictionary is corrected, or equivalently, updated based on such a user operation. As discussed above with regard to FIGS. 23A and 23B, the correction may be received via a moving operation.

If it is determined in step S1003 that a correction instruction is not received, processing illustrated in FIG. 38 ends. On the other hand, if in step S1003 it is determined that a correction instruction is received, processing proceeds to step S1004. In step S1004 an information group to which the feature information in question belongs is corrected according to the user's moving operation. As stated above with regard to FIGS. 23A and 23B, in an exemplary embodiment, the third face image 1204 from the left on the UI illustrated in FIG. 12 corresponds to the third face feature amount 2304 from the left, registered with a dictionary ID of 1 in the face dictionary illustrated in FIG. 23A. According to the user's moving operation, the information processing apparatus 115 moves the third face feature amount 2304 from the left registered in the face feature amount group 2303 identified by the dictionary ID of 1 which is associated with father in FIG. 23A to the face feature amount group 2303 of son as illustrated in FIG. 23B. In other words, the information processing apparatus 115 removes the face feature amount 2304 corresponding to the face to be corrected from the face feature amount group 2303 associated with the person ID of father, and registers a face feature amount 2401 corresponding to the face to be corrected into the face feature amount group 2303 associated with the person ID of son. After correcting an information group to which the feature information belongs (step S1004), processing illustrated in FIG. 38 ends.

While the exemplary embodiments of the present invention have been described above, a basic configuration of an exemplary embodiment of the present invention is not limited to the foregoing. The foregoing exemplary embodiments are a unit for obtaining the effects of an exemplary embodiment of the present invention, and it will be understood that similar other techniques and/or different parameters may be used without departing from the scope of an exemplary embodiment of the present invention as far as similar effects to those of an exemplary embodiment of the present invention are obtained.

For example, in the fourth exemplary embodiment, if there is no free space in the face feature amount group having a predetermined dictionary ID, the information processing apparatus 115 generates a new dictionary ID or add the face feature amount to a face feature amount group of the next-similar dictionary ID. However, the information processing apparatus 115 need not add the face feature amount to the dictionary.

In the present exemplary embodiment, the user makes an operation to drag and drop an image registered in an incorrect group to a correct person group by using a mouse pointer. However, the operation is not limited to an operation by the mouse pointer.

The foregoing exemplary embodiments have been described by using persons as examples of objects. However, objects are not limited to persons. Recognition processing of pets such as dogs and cats may be performed to recognize and set the pets as objects. Buildings and small articles can be recognized by performing recognition processing on edge-detected shapes. Buildings and small articles, therefore, can also be set as objects. In such cases, image processing can be performed in the same way as in the foregoing exemplary embodiments by extracting feature amounts of the objects and registering the extracted feature amounts into a dictionary.

In the foregoing exemplary embodiments, the information processing apparatus 115 performs display control to correct a group display of object-by-object classifications of objects (persons) according to a correction instruction given by a user operation and display the resultant on the display device 104. However, this is not restrictive. For example, the object classifications need not be displayed on the display device 104. In such a case, the information processing apparatus 115 may classify and manage objects extracted from image data object by object, and change, correct, and manage the object classifications in the background when a correction instruction is given by the user. Such management enables the automatic layout generation processing illustrated in FIG. 15 to generate appropriate layouts. The foregoing exemplary embodiments have dealt with the cases of generating a single page of output product on which a plurality of images is arranged as a layout output product. However, an exemplary embodiment of the present invention may be applied to an album output of a plurality of pages.

According to an exemplary embodiment of the present invention, when the user corrects face information that has caused misrecognition, the information processing apparatus 115 can reflect the corrected information without reducing the accuracy of individual recognition. As a result, the information processing apparatus 115 subsequently can correctly classify faces of the same person with different face feature amounts as the same person. This can improve the accuracy of individual recognition.

With the improved accuracy of individual recognition, the information processing apparatus 115 can generate layouts more desirable by the user when automatically generating layout products by using individual recognition information.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

All the foregoing processing need not be implemented by software. A part or all of the processing may be implemented by hardware.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-153671 filed Jul. 9, 2012, which is hereby incorporated by reference herein in its entirety.

What is claimed is:

1. An apparatus comprising:
one or more processors; and
memory storing instructions that, when executed by the one or more processors, cause the apparatus to perform operations comprising:
managing, at a management unit, a plurality of object feature amounts in a dictionary by classifying the plurality of object feature amounts into feature amount groups, each feature amount group having similar object feature amounts, wherein each object feature amount is extracted from a corresponding object image from among a plurality of images;
causing, at a display control unit, a display unit to display object images, which are classified into a plurality of object groups, by the object group on a display screen;
receiving, at a receiving unit, a user's change instruction for changing an object group to which an object image belongs, the user's change instruction being a moving operation of the object image from a first object group to a second object group on the display screen; and
correcting, at a correction unit, if the user's change instruction is received by the receiving unit, in the dictionary, an object feature amount of a feature amount group which corresponds to the moved image before and/or after the user's change instruction is received,
wherein
the management unit is further configured to manage the object feature amounts by associating feature amount groups corresponding to a same type of objects,
the display control unit is configured to cause the display unit to display object images, wherein the object images corresponding to the associated feature amount groups are displayed grouped into one object group based on the dictionary, and
the management unit is configured to, if a type of an object is associated with two or more feature amount groups, not combine the two or more feature amount groups.

2. The apparatus according to claim 1, wherein the correction unit is configured to, if the user's change instruction is received by the receiving unit, delete the object feature amount corresponding to the moved image from a first feature amount group into which the object feature amount has been classified until the user's change instruction is received.

3. The apparatus according to claim 2, wherein the correction unit is configured to, if the user's change instruction is received by the receiving unit, change a feature amount group of the object feature amount corresponding to the moved image by deleting the object feature amount corresponding to the moved image from the first feature amount group into which the object feature amount has been classified until the user's change instruction is received, and adding the object feature amount into a second feature amount group which is different from the first feature amount group, according to the user's change instruction.

4. The apparatus according to claim 1, wherein the correction unit is configured to, if a type of an object of the moved image is associated with two or more feature amount groups, add the object feature amount corresponding to the moved image to a feature amount group into which an object feature amount having a higher degree of similarity to the object feature amount corresponding to the moved image has been classified from among the two or more feature amount groups.

5. The apparatus according to claim 1, wherein the correction unit is configured to, if a degree of similarity between the object feature amount corresponding to the moved image and an object feature amount included in a feature amount group associated with a same type of objects as the moved image is lower than or equal to a predetermined standard, generate a new feature amount group for the object feature amount corresponding to the moved image.

6. The apparatus according to claim 1, wherein the management unit is configured to set an upper limit to a number of object feature amounts belonging to each feature amount group, and wherein the operations further comprise determining, at a replace determination unit, whether to replace an object feature amount belonging to a first feature amount group based on a degree of similarity between the object feature amount belonging to the first feature amount group and the object feature amount corresponding to the moved image.

7. The apparatus according to claim 1, wherein the operations further comprise determining, at a similarity determination unit, whether a degree of similarity between an object feature amount extracted from an object image in an image and the object feature amount managed in the dictionary by the management unit is higher than or equal to a predetermined threshold.

8. The apparatus according to claim 7, wherein a second threshold which is higher than the predetermined threshold is set as a threshold of a feature amount group into which the object feature amount corresponding to the moved image has been classified until the user's change instruction is received, if the user's change instruction is received by the receiving unit.

9. The apparatus according to claim 1, wherein the dictionary is used for individual recognition.

10. The apparatus according to claim 1, wherein the object feature amount is a face feature amount.

11. The apparatus according to claim 1, wherein the type of object includes at least one of creatures and buildings.

12. The apparatus according to claim 11, wherein the creatures include humans.

13. A method comprising:
managing a plurality of object feature amounts in a dictionary by classifying the plurality of object feature amounts into feature amount groups, each feature amount group having similar object feature amounts, wherein each object feature amount is extracted from a corresponding object image from among a plurality of images;

causing a display unit to display object images, which are classified into a plurality of object groups, by the object group on a display screen, wherein the object images are displayed grouped into object groups;

receiving a user's change instruction for changing an object group to which an object image belongs, the user's change instruction being a moving operation of the object image from a first object group to a second object group on the display screen; and correcting, if the user's change instruction is received in the receiving, in the dictionary, an object feature amount of a feature amount group which corresponds to the moved image before and/or after the user's change instruction is received, wherein the plurality of object feature amounts are managed by associating feature amount groups corresponding to a same type of objects, the display unit is caused to display object images, wherein the object images corresponding to the associated feature amount groups are displayed grouped into one object group based on the dictionary, and if a type of an object is associated with two or more feature amount groups, the two or more feature amount groups are not combined.

14. A non-transitory computer-readable recording medium configured to store computer executable instructions that cause a computer to perform a process, the process comprising;

managing, at a management unit, a plurality of object feature amounts in a dictionary by classifying the plurality of object feature amounts into feature amount groups, each feature amount group having similar object feature amount, wherein each object feature amount is extracted from a corresponding object image from among a plurality of images;

causing, at a display control unit, a display unit to display object images, which are classified into a plurality of object groups, by the object group on a display screen, wherein the object images are displayed grouped into object groups;

receiving, at a receiving unit, a user's change instruction for changing an object group to which an object image belongs, the user's change instruction being a moving operation of the object image from a first object group to a second object group on the display screen; and correcting, at a correction unit, if the user's change instruction is received by the receiving unit, in the dictionary, an object feature amount of a feature amount group which corresponds to the moved image before and/or after the user's change instruction is received, wherein the plurality of object feature amounts are managed by associating feature amount groups corresponding to a same type of objects at the management unit, the display unit is caused to display object images at the display control unit, wherein the object images corresponding to the associated feature amount groups are displayed grouped into one object group based on the dictionary, and if a type of an object is associated with two or more feature amount groups, the two or more feature amount groups are not combined at the management unit.

15. The non-transitory computer-readable recording medium according to claim 14, wherein if the user's change instruction is received by the receiving unit, the object feature amount corresponding to the moved image is deleted from a first feature amount group into which the object feature amount has been classified until the user's change instruction is received.

16. The non-transitory computer-readable recording medium according to claim 15, wherein if the user's change instruction is received by the receiving unit, a feature group of the object feature amount corresponding to the moved image is changed by deleting the object feature amount corresponding to the moved image from the first feature amount group into which the object feature amount has been classified until the user's change instruction is received, and adding the object feature amount into a second feature amount group according to the user's change instruction at the correction unit.

17. The non-transitory computer-readable recording medium according to claim 14, wherein if a type of an object of the moved image is associated with the two or more feature amount groups, the object feature amount corresponding to the moved image is added to a feature amount group of the object feature amount having a higher degree of similarity to the object feature amount corresponding to the moved image among the two or more feature amount groups at the correction unit.

18. The non-transitory computer-readable recording medium according to claim 14, wherein if a degree of similarity between the object feature amount corresponding to the moved image and an object feature amount included in a feature amount group associated with a same type of objects as the moved image is lower than or equal to a predetermined standard, a new feature amount group for the object feature amount corresponding to the moved image is generated at the correction unit.

19. The non-transitory computer-readable recording medium according to claim 14, wherein the management unit is configured to set an upper limit to a number of object feature amounts belonging to each feature amount group, and wherein the process further comprises determining, at a replace determination unit, whether to replace an object feature amount belonging to a first feature amount group based on a degree of similarity between object feature amounts belonging to the first feature amount group and the object feature amount corresponding to the moved image.

20. The non-transitory computer-readable recording medium according to claim 14, wherein the process further comprises:

determining, at a similarity determination unit, whether a degree of similarity between a object feature amount extracted from an object image and the object feature amount managed in the dictionary by the management unit is higher than or equal to a predetermined threshold.

21. The non-transitory computer-readable recording medium according to claim 20, wherein a second threshold which is higher than the predetermined threshold is set as a threshold of a feature amount group into which the object feature amount corresponding to the moved image has been classified until the user's change instruction is received, if the user's change instruction is received by the receiving unit.

22. The non-transitory computer-readable recording medium according to claim 14, wherein the dictionary is used for individual recognition.

23. The non-transitory computer-readable recording medium according to claim 14, wherein the object feature amount is a face feature amount.

24. The non-transitory computer-readable recording medium according to claim 14, wherein the type of object includes at least one of creatures and buildings.

25. The non-transitory computer-readable recording medium according to claim 24, wherein the creatures include humans.

26. A non-transitory computer-readable recording medium configured to store computer executable instructions that cause a computer to perform a process, the process comprising;
  managing, at a management unit, a plurality of object feature amounts in a dictionary by classifying the plurality of object feature amounts into feature amount groups, each feature amount group having similar object feature amount, wherein each object feature amount is extracted from a corresponding object image from among a plurality of images;
  causing, at a display control unit, a display unit to display object images, which are classified into a plurality of object groups, by the object group on a display screen, wherein the object images are displayed grouped into object groups;
  receiving, at a receiving unit, a user's change instruction for changing an object group to which an object image belongs, the user's change instruction being a moving operation of the object image from a first object group to a second object group on the display screen; and
  correcting, at a correction unit, if the user's change instruction is received by the receiving unit, in the dictionary, a feature amount group of an object feature amount which corresponds to the moved image before and/or after the user's change instruction is received, wherein
  the management unit is configured to set an upper limit to a number of object feature amounts belonging to each feature amount group, and
  the process further comprises determining, at a replace determination unit, whether to replace an object feature amount belonging to a first feature amount group based on a degree of similarity between object feature amounts belonging to the first feature amount group and the object feature amount corresponding to the moved image.

* * * * *